United States Patent
Watanabe et al.

(10) Patent No.: US 7,578,766 B2
(45) Date of Patent: Aug. 25, 2009

(54) APPARATUS AND METHOD FOR CONTROLLING AUTOMATIC TRANSMISSION

(75) Inventors: Masato Watanabe, Nagoya (JP); Masahito Kaigawa, Toyota (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 210 days.

(21) Appl. No.: 11/840,572

(22) Filed: Aug. 17, 2007

(65) Prior Publication Data

US 2008/0058159 A1 Mar. 6, 2008

(30) Foreign Application Priority Data

Sep. 1, 2006 (JP) ............................. 2006-237506

(51) Int. Cl.
*B60W 10/04* (2006.01)
(52) U.S. Cl. ...................................... 477/107; 477/110
(58) Field of Classification Search ................. 477/107, 477/110
See application file for complete search history.

(56) References Cited

U.S. PATENT DOCUMENTS

| | | | |
|---|---|---|---|
| 6,684,144 B2* | 1/2004 | Sekii et al. .................... | 701/51 |
| 6,790,160 B2* | 9/2004 | Kato et al. .................... | 477/154 |
| 6,931,315 B2* | 8/2005 | Ayabe et al. .................. | 701/59 |
| 7,168,422 B1* | 1/2007 | Takata ......................... | 123/674 |
| 7,194,348 B2* | 3/2007 | Wada et al. ................... | 701/55 |

FOREIGN PATENT DOCUMENTS

| | | |
|---|---|---|
| JP | 63-043057 A | 2/1988 |
| JP | 03-041259 A | 2/1991 |
| JP | 04-341656 A | 11/1992 |
| JP | 2003-28284 A | 1/2003 |
| JP | 2004-092703 A | 3/2004 |
| JP | 2004-218799 A | 8/2004 |
| JP | 2004-316845 A | 11/2004 |

* cited by examiner

*Primary Examiner*—Ha D. Ho
(74) *Attorney, Agent, or Firm*—Sughrue Mion, PLLC

(57) ABSTRACT

An apparatus and a method for controlling an automatic transmission that executes the learning of a shift point and provides an optimal upshift even when a vehicle is driven under conditions where resistance to driving varies greatly, such as when going up or down a hill or when towing. A reference engine acceleration is calculated and used to estimate a maximum engine rotational speed based on the relationship between the reference engine rotational acceleration and the engine rotational acceleration speed at an shift point. The shift point is corrected based on the deviation between the estimated engine rotational speed and a target maximum engine rotational speed at the shift point.

16 Claims, 16 Drawing Sheets

|  | C1 | C2 | B1 | B2 | B3 | TRANSMISSION GEAR RATIO | STEP |
|---|---|---|---|---|---|---|---|
| 1st | ○ |  |  | ◎ |  | 3.194 | 1.650 |
| 2nd | ○ |  | ○ |  |  | 1.935 | 1.351 |
| 3rd | ○ |  |  |  | ○ | 1.433 | 1.433 |
| 4th | ○ | ○ |  |  |  | 1.000 | 1.465 |
| 5th |  | ○ |  |  | ○ | 0.683 | 1.190 |
| 6th |  | ○ | ○ |  |  | 0.574 | TOTAL 5.568 |
| Rev |  |  |  | ○ | ○ | 3.586 |  |

APPARATUS AND METHOD FOR CONTROLLING AUTOMATIC TRANSMISSION

INCORPORATION BY REFERENCE

This disclosure of Japanese Patent Application No. 2006-237506, filed on Sep. 1, 2006 including the specification, drawings, and abstract is incorporated by reference in its entirety.

BACKGROUND OF THE INVENTION

1. Field of the Invention

The present invention relates to an apparatus and a method for controlling an automatic transmission for a vehicle; and, more particularly, to a technique for controlling a shifting output timing of the automatic transmission in such a manner that, in a up-shift under a high-load condition, e.g., towing, driving up a hill, or the like, the engine rotational speed during an inertia phase start point approaches an engine rotational speed in a predetermined range of a target maximum engine rotational speed as quickly as possible.

2. Description of the Related Art

For a vehicle, in which the power-on and up-shift operation of an automatic transmission is executed in response to a shift command, there has been known a shift control apparatus for automatic transmissions, which controls the shift point of an automatic transmission such that the engine rotational speed at an inertia phase start point in an up-shift mode with a fully depressed accelerator pedal or a fully open throttle valve approaches a preset engine rotational speed zone. For example, such a conventional shift control apparatus is described in Japanese Patent Application Publication No. JP-A-2003-28284. The shift control apparatus uses a shift line (shift pattern) in which, when an automatic transmission performs or executes an up-shift operation when the accelerator pedal is fully depressed or a throttle valve is fully open (100%), the shift control apparatus controls the automatic transmission such that the engine rotational speed approaches a high rotational speed, without entering a preset red zone or a fuel cut zone beyond the red zone. Further, the shift pattern of the shift control apparatus varies according to the carrying capacity of a vehicle, thus enabling the automatic transmission to execute the shift operation at an optimal point.

When a vehicle having a conventional shift control apparatus drives in a state in which resistance to driving varies greatly such as when driving up and down hills or towing, the rising ratio or the rising speed of the engine rotational speed after a shift operation (shift output) varies. Thus, the shift control apparatus cannot provide a full throttle up-shift operation, wherein the engine rotational speed can approach a high rotational speed, without entering a preset red zone or a fuel cut zone beyond the red zone. In an effort to solve the problem, Japanese Patent Application Publication No. JP-A-2004-316845 describes a technique in which a plurality of learning sections is provided according to the state of driving of a vehicle, and the shift point is learned and corrected in every learning section, so that the learning of the shift point can be executed during driving conditions such as those encountered when driving up a hill or towing, which affect vehicle acceleration.

However, when a small number of learning sections is provided, the shift operations may be indiscriminately executed at some shift points within the learning sections despite a wide range of vehicle acceleration, so that shift precision may be reduced. Meanwhile, when a great number of learning sections is provided, the learning of the shift points in the sections may take excessive time and may increase the capacity of the memory of the shift control apparatus, thus increasing the cost of the shift control apparatus.

SUMMARY OF THE INVENTION

Accordingly, the present invention provides an apparatus and a method for controlling an automatic transmission for a vehicle, which executes the learning of a shift point to provide an optimal up-shift operation even when a vehicle drives in a state in which resistance to driving varies greatly, such as when driving up or down a hill or towing.

A first aspect of the present invention is directed to an apparatus for controlling an automatic transmission of a vehicle based on a learning correction value, wherein the learning correction value is determined in a manner that a maximum engine rotational speed substantially approaches a target maximum engine rotational speed and the maximum engine rotational speed is the engine rotational speed to be reached during a predetermined time period after upshift executed when the speed of the vehicle passes a preset shift point during power-on driving, the apparatus comprising: learning control unit for estimating an estimated maximum engine rotational speed by replacing the maximum engine rotational speed after the upshift in the power-on driving with a maximum engine rotational speed in a reference driving state not affecting acceleration of the vehicle, and calculating the learning correction value based on a deviation between the estimated maximum engine rotational speed and the target maximum engine rotational speed.

In the control apparatus, learning control unit calculates the estimated maximum engine rotational speed by replacing the maximum engine rotational speed after the upshift in the power-on driving with a maximum engine rotational speed in a reference driving state not affecting acceleration of the vehicle, and calculating the learning correction value based on a deviation between the estimated maximum engine rotational speed and the target maximum engine rotational speed. In the above state, the control apparatus can accurately and easily learn the shift point even when the acceleration in a shift operation differs from typical acceleration, such as when the vehicle performs towing or drives uphill.

Here, preferably, the reference driving state is a driving state of the vehicle when the vehicle is an empty vehicle and drives on a level road. Thus, the learning control unit calculates the estimated maximum engine rotational speed by replacing the maximum value of the engine rotational speed, after the upshift in the power-on driving, with a value in the driving state of the empty vehicle on the level road. Thereafter, the learning control unit calculates the learning correction value, based on the deviation between the estimated maximum engine rotational speed and the target maximum engine rotational speed. Thus, the control apparatus learns the shift point even when the acceleration in a shift operation differs from typical acceleration, such as when the vehicle is towing an object or driving uphill.

Further preferably, the power-on driving is a maximum acceleration driving when an accelerator pedal is manipulated to provide a maximum output power for engine. Thus, particularly in a WOT (wide open throttle) shift operation, in which the maximum engine rotational speed during the shift operation is required to follow the target maximum engine rotational speed, it is possible to prevent the up-shift from being executed before the maximum engine rotational speed has approached the target maximum engine rotational speed, or to prevent the up-shift from being executed when the engine rotational speed continuously exceeds an allowable maximum engine rotational speed, thus allowing a user to use the automatic transmission with comfort.

Preferably, the learning control unit comprises an estimated maximum engine rotational speed calculation unit for multiplying a deviation between an engine rotational speed at the upshift point and the target maximum engine rotational speed by a ratio of an engine rotational acceleration rate in the reference driving state to an engine rotational acceleration rate at the upshift point, and adding the product to the engine rotational speed at the upshift point to provide the estimated maximum engine rotational speed. Thus, the estimated maximum engine rotational speed calculation unit included in the learning control unit calculates the estimated maximum engine rotational speed by multiplying a deviation between an engine rotational speed at the upshift point and the target maximum engine rotational speed by a ratio of an engine rotational acceleration rate in the reference driving state to an engine rotational acceleration rate at the upshift point, and adding the product to the engine rotational speed at the upshift point.

Further preferably, the learning control unit comprises an estimated maximum engine rotational speed calculation unit that multiplies the product of multiplying the time period from an upshift point to an associated upshift inertia phase start point by the engine rotational acceleration rate at the time by a ratio of an engine rotational acceleration rate at the upshift point in the reference driving state to the engine rotational acceleration rate at the upshift point, and adding the resulting product to the engine rotational speed at upshift point to provide the estimated maximum engine rotational speed. Thus, the control apparatus determines the estimated maximum engine rotational speed using the estimated maximum engine rotational speed calculation unit, without actually measuring the engine rotational speed until the inertia phase start point.

Preferably, the learning control unit comprises a learning correction-value calculation unit for calculating the learning correction value using a stored relation, based on the deviation between the estimated maximum engine rotational speed and the target maximum engine rotational speed. In the above case, the learning correction value determined by the learning correction-value calculation unit can be determined, based on the deviation between the target maximum engine rotational speed and the estimated maximum engine rotational speed, which is determined by replacing the maximum value of the engine rotational speed, after the up-shift in the power-on driving, with the value in the reference driving state which is not affected by acceleration of the vehicle. Thus, the control apparatus learns the shift point even when the acceleration during the shift differs from typical acceleration, such as when the vehicle is towing or driving uphill.

Preferably, the learning control unit comprises a correction-value limiting unit for limiting the learning correction value calculated by the learning correction-value calculation unit in a range from a preset maximum value to a preset minimum value. In the above state, the learning correction-value calculated by the learning correction-value calculation unit is limited to between the preset maximum value and the minimum value by the correction-value limiting unit, so that the results of leaning do not substantially vary, thus avoiding erroneous learning.

Further preferably, the learning correction value calculation unit determines the learning correction value based on a working fluid temperature of the automatic transmission. In the above state, the shift point is learned based on the working fluid temperature of the automatic transmission, so that the shift point can be more precisely corrected.

Further preferably, the learning control unit does not use a learning result obtained when a fuel cut for an engine is executed during an upshift. In the above case, the learning results from a particular upshift, wherein a fuel cut for the engine is executed, may be ignored, thus avoiding erroneous learning.

Further preferably, the learning control unit corrects the shift point by learning in a manner that, as the deviation between the estimated maximum engine rotational speed and the target maximum engine rotational speed increases, the shift point occurs at a higher vehicle speed. In the above state, the up-shift is output at a shift point located within a high vehicle speed section, as the deviation between the estimated maximum engine rotational speed and the target maximum engine rotational speed increases. Thus, it is possible to prevent the upshift from occurring before the maximum engine rotational speed has approached the target maximum engine rotational speed, or to prevent the upshift from occurring when the engine rotational speed continuously exceeds an allowable maximum engine rotational speed, thus allowing a user to use the automatic transmission with comfort.

The learning correction value calculation unit calculates the learning correction value by multiplying the deviation between the estimated maximum engine rotational speed and the target maximum engine rotational speed by a learning correction coefficient for determining a learning weight.

The learning correction-value calculation unit further comprises unit for determining the learning correction value based on an working fluid viscosity of the automatic transmission. In the above state, the working fluid viscosity of the automatic transmission may be measured using a viscometer, which may be installed in the automatic transmission.

In another aspect, the present invention provides a method for controlling an automatic transmission for a vehicle, comprising: determining whether preconditions for executing a shift point correction control is satisfied; if so, calculating an engine rotational acceleration rate at an up-shift point in a reference driving state; calculating an estimated maximum engine rotational speed by replacing a maximum engine rotational speed, after an upshift in a power-on driving, with an engine rotational speed in a reference driving state which does not affecting acceleration of a vehicle; executing a learning control for calculating a learning correction value, based on a deviation between the estimated maximum engine rotational speed and a target maximum engine rotational speed; and executing the shift point correction control according to execution of the learning control. When the preconditions are not satisfied, the shift point correction control is terminated.

Examples of the preconditions are a fully open throttle opening ratio, an actuation oil temperature above a predetermined point, an engine coolant temperature not lower than a predetermined point, a normal state of an engine rotational speed sensor, and a normal state of a hydraulic frictional engagement device related to a full throttle up-shift.

The estimated maximum engine rotational speed may be calculated by multiplying the deviation between the engine rotational speed at an up-shift point and the target maximum engine rotational speed by a ratio of the engine rotational acceleration rate at the up-shift point in the reference driving state to an actual engine rotational acceleration rate, and adding the engine rotational speed at the up-shift point to the multiplication result.

The estimated maximum engine rotational speed is calculated by multiplying the product of multiplying the time period from an up-shift point to an associated up-shift inertia phase start point by an engine rotational acceleration rate at the time, by a ratio of an engine rotational acceleration rate at the up-shift point in the reference driving state to an engine rotational acceleration rate at the up-shift point, and by then adding the engine rotational speed at the up-shift point to the final resulting product.

The learning control for calculating the learning correction value comprises: calculating the deviation between the estimated maximum engine rotational speed and the target maximum engine rotational speed; calculating a shift point amount of learning based on the deviation; determining whether the shift point amount of learning is included in a preset range of amount of learning; if so, adding the calculated shift point amount of learning to a previous amount of learning to provide a newly updated total amount of learning accumulated; and determining the newly updated total amount of learning is included within a preset range of total amount of learning, and, if so, calculating a learning correction value and terminating a learning control.

When the calculated shift point amount of learning and the newly updated total amount of learning fall outside the respective preset ranges, the calculated shift point amount of learning and the newly updated total amount of learning are limited to the respective ranges.

The control method may further comprise: executing the shift point correction control by measuring a working fluid temperature of the automatic transmission after the preconditions are satisfied, and by using the working fluid temperature in the learning control for calculating the learning correction value.

The control method may further comprise: determining whether a fuel cut is executed during a shift after the learning control for calculating the learning correction value is executed.

If the fuel cut is executed during the shift, a learning value of the shifting operation is cleared; and when the fuel cut is not executed, the shift point correction control is executed according to execution of the learning control.

BRIEF DESCRIPTION OF THE DRAWINGS

The above and other objects and features of the present invention will become apparent from the following description of an example embodiment, given in conjunction with the accompanying drawings, in which.

DETAILED DESCRIPTION OF EXAMPLE EMBODIMENTS

Various embodiments of the present invention will now be described in detail with reference to the accompanying drawings.

Figures 1, 2:
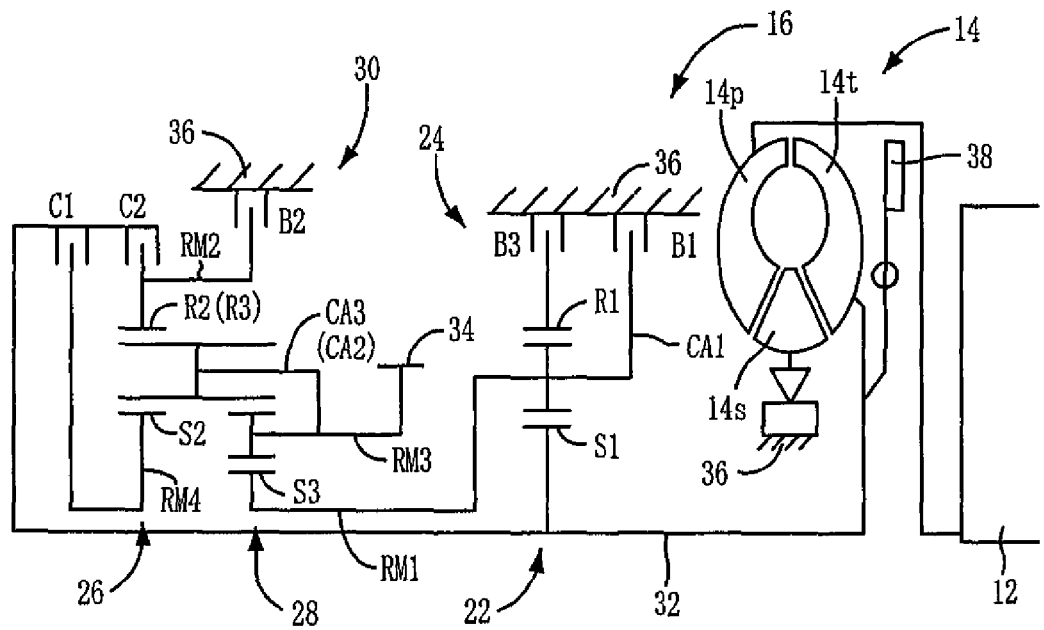
FIG. 1 is a schematic diagram showing a vehicular automatic transmission equipped with a shift control apparatus according to a first embodiment of the present invention.
FIG. 2 is a operation table illustrating shift operations executed by the automatic transmission of FIG. 1.

FIG. 1 is a diagram showing a power transmission system 10 for vehicles equipped with a shift control apparatus according to a first embodiment of the present invention. The power transmission system 10 comprises a transversely installed automatic transmission 16 and is preferably used in FF (Front engine and Front wheel drive) vehicles, and has an engine 12 as a driving power source of a vehicle. The output power of engine 12, which is an internal combustion engine, is transmitted to left and right drive wheels through a torque converter 14, the automatic transmission 16, a differential gear unit (not shown), a pair of axles, etc.

The torque converter 14 comprises a pump blade 14$p$ coupled to a crank shaft of the engine 12, a turbine blade 14$t$ coupled to an input shaft 32 of the automatic transmission 16, and a fixed blade 14$s$ coupled to a transmission casing 36 through an unidirectional clutch. The torque converter 14 transmits engine power using fluid. Further, a lock-up clutch 38 is installed between the pump blade 14$p$ and the turbine blade 14$t$. Further, a directional control valve of a hydraulic control circuit (not shown) controls the flow direction of oil, such that the oil flows either to an engagement chamber or to a release chamber of the torque converter, thus putting the torque converter into one of an engagement state, a slip state and a release state. When the torque converter is brought into a full engagement state, the pump blade 14$p$ and the turbine blade 14$t$ rotate together.

The automatic transmission 16 comprises a first transmission unit 24 mainly constructed with a single pinion-type first planetary gear unit 22, and a second transmission unit 30 mainly constructed with both a single pinion-type second planetary gear unit 26 and a double pinion-type third planetary gear unit 28, wherein the first and second shift units 24 and 30 are coaxially installed. The automatic transmission 16 changes the rotating speed of the input shaft 32, and outputs the rotating force of the input shaft 32 to the drive wheels through an output gear 34. The input shaft 32 functions as an input member and uses a turbine shaft of the torque converter, which is rotated by the engine 12 or the like, functioning as the driving power source of the vehicle. The output gear 34 functions as an output member and engages directly with the differential gear unit or indirectly with the differential gear unit through a counter shaft, and rotates the left and right drive wheels. Further, the automatic transmission 16 is constructed symmetrically around a central axis. However, in FIG. 1 and in the other figures illustrating the other embodiments of the present invention, the lower part of the automatic transmission 16 below the central axis is not shown.

The first planetary gear unit 22, constituting the first shift unit 24, comprises three rotary elements, which are a sun gear S1, a carrier CA1 and a ring gear R1. The sun gear S1 is rotatably coupled to the input shaft 32 so as to rotate along with the input shaft 32, while the ring gear R1 is fixed to the transmission casing 36 through a third brake B3 so as not to rotate. The carrier CA1 functions as an intermediate output member and reduces the rotational speed of the input shaft 32 prior to outputting the rotating force of the input shaft 32. Further, the second planetary gear unit 26 and the third planetary gear unit 28, constituting the second shift unit 30, are partially coupled to each other, thus forming four rotary elements RM1 to RM4. Described in detail, a sun gear S3 of the third planetary gear unit 28 forms a first rotary element RM1. A ring gear R2 of the second planetary gear unit 26 and a ring gear R3 of the third planetary gear unit 28 are coupled to each other and form a second rotary element RM2. A carrier CA2 of the second planetary gear unit 26 and a carrier CA3 of the third planetary gear unit 28 are coupled to each other and form a third rotary element RM3. Further, a sun gear S2 of the second planetary gear unit 26 forms a fourth rotary element RM4. The carriers CA2 and CA3 of the second and third planetary gear units 26 and 28 are configured as a common element. In the same manner, the ring gears R2 and R3 of the second and third planetary gear units 26 and 28 are configured as a common element. Further, a pinion gear of the second planetary gear unit 26 is configured as a Ravigneaux type planetary gear train, which also functions as a second pinion gear of the third planetary gear unit 28.

The first rotary element RM1 (sun gear S3) is selectively connected to the transmission casing 36 through a first brake B1 to stop rotating the first rotary element RM1. The second rotary element RM2 (ring gear R2, R3) is selectively connected to the transmission casing 36 through a second brake B2 to stop rotating the second rotary element RM2. The fourth rotary element RM4 (sun gear S2) is selectively connected to the input shaft 32 through a first clutch C1. The second rotary element RM2 (ring gear R2, R3) is selectively connected to the input shaft 32 through a second clutch C2. The first rotary element RM1 (sun gear S3) is integrally connected to the carrier CA1 of the first planetary gear unit 22, which acts as the intermediate output element. The third rotary element RM3 (carrier CA2, CA3) is integrally connected to the output gear 34, and outputs the rotating force of the input gear 32 through the output gear 34. Each of the first brake B1 to the third brake B3, the first clutch C1 and the second clutch C2 is a hydraulic multi-disc device such as multi-disc clutch brought into frictional engagement by the operation of a hydraulic cylinder.

The operation table of FIG. 2 shows the relationship between the operation of the clutches C1 and C2 and the operation of the brakes B1 to B3 at each shift stage. In the Table, "single-circle" denotes engagement, and "double-circle" denotes engagement executed only when an engine brake works. In the respective shift stages, the transmission gear ratios are appropriately determined by the gear ratios $\rho 1$, $\rho 2$, $\rho 3$ of the first planetary gear unit 22, the second planetary gear unit 26, and the third planetary gear unit 28. For example, when the gear ratios are set as follows: $\rho 1 \approx 0.45$, $\rho 2 \approx 0.38$ and $\rho 3 \approx 0.41$, the transmission gear ratio shown in FIG. 2 can be obtained. Further, when the gear ratios are set as described above, an appropriate value of the gear ratio step (the ratio of the transmission gear ratios in the respective shift stages) can be obtained, the entire range of the transmission gear ratios (=3.19/0.57) is calculated to about 5.6 indicating wideness, and an appropriate transmission gear ratio in the reverse shift stage "Rev" can be obtained. Thus, the above-mentioned gear ratios can provide appropriate transmission gear ratio characteristics. As described above, the automatic transmission 16 according to the first embodiment provides a multi-stage shift, comprising six forward shift stages, using the three planetary gear units 22, 26 and 28, the two clutches C1 and C2 and the three brakes B1 to B3. Therefore, the automatic transmission 16 reduces the number of clutches, compared to a conventional automatic transmission, which generally include three clutches and two brakes. Thus, reduction in weight of the automatic transmission 16, reduced production costs and a reduced shaft length can be achieved. Particularly, the single pinion-type second planetary gear unit 26 and the double pinion-type third planetary gear unit 28 constituting the second shift unit 30 are configured as a Ravigneaux type planetary gear train, so that the number of elements and the shaft length of the automatic transmission are further reduced, compared to the conventional automatic transmission.

Figure 3:
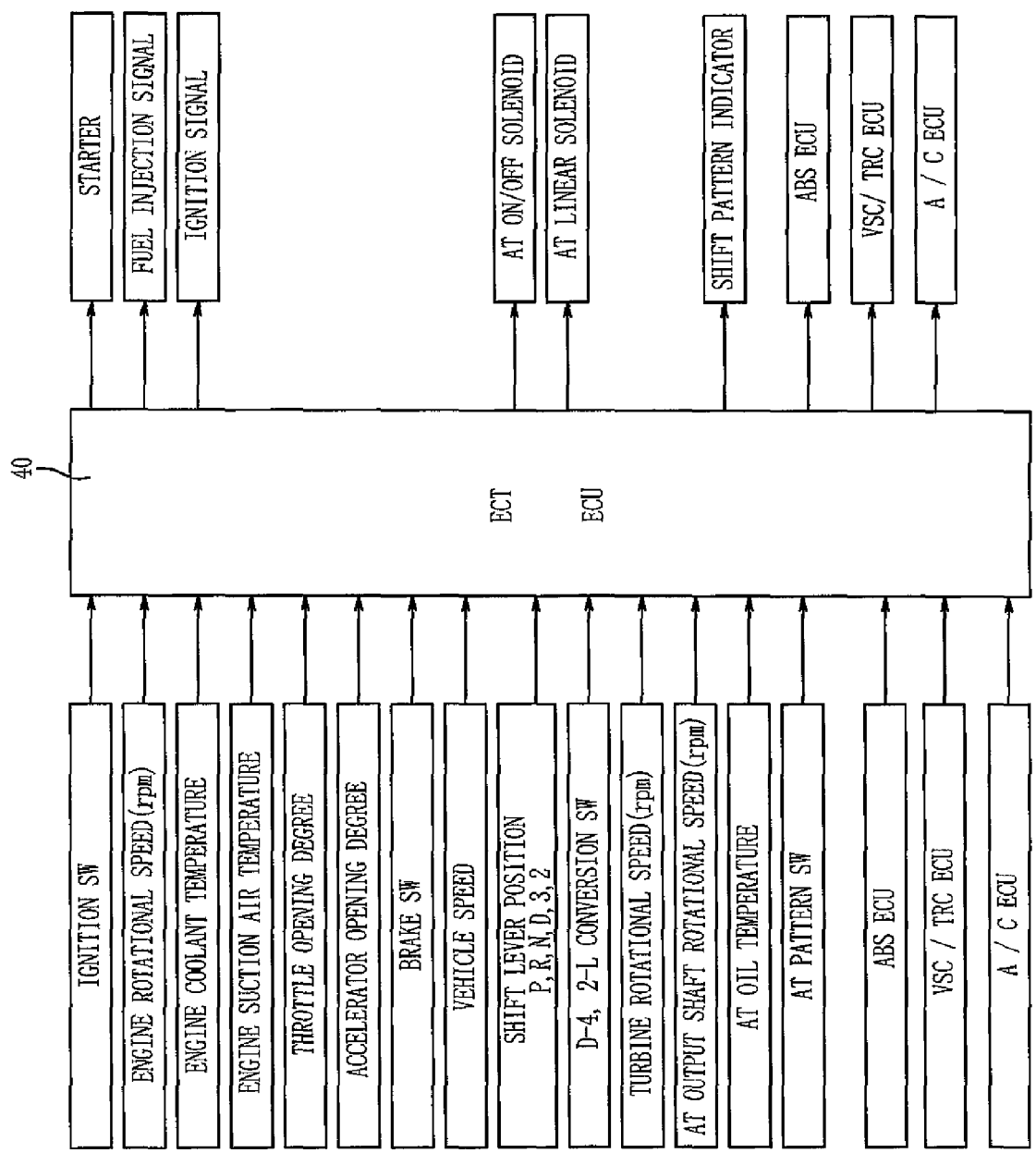
FIG. 3 is a block diagram showing input and output signal of an electronic control unit used in the embodiment of FIG. 1.

FIG. 3 is a block diagram showing the input and output signal of an electronic control unit 40, which functions as the automatic shift control apparatus for controlling the shift operation of the automatic transmission 16. As shown in FIG. 3, the electronic control unit 40 receives a switch-on signal from an ignition switch, a signal that indicates engine rotational speed (rpm) NE detected by an engine rotation sensor, a signal that indicates engine coolant temperature Tw NE detected by an engine coolant temperature sensor, a signal that indicates an engine suction air temperature Ta NE detected by an engine suction air temperature sensor, a signal that indicates a throttle opening degree θth NE detected by a throttle opening degree sensor 48, a signal that indicates an accelerator operation amount θacc detected by an accelerator operation amount sensor, a signal that indicates brake manipulation from a brake switch, a signal that indicates vehicle speed V detected by a vehicle speed sensor, a signal that indicates the frontward or rearward position of a shift lever detected by a shift lever position sensor, a signal that indicates a leftward or rightward position of the shift lever detected by the shift lever position sensor, a signal that indicates an rotational speed Nt of a turbine blade 14t detected by a turbine rotation sensor, a signal that indicates an rotational speed Nout of the output gear (output shaft) of the automatic transmission 16, a signal that indicates an oil temperature Toil of the automatic transmission 16, a signal that indicates the manipulated position of a shift pattern conversion switch, a signal output from an ABS electronic control unit, a signal output from a VSC/TRC electronic control unit, a signal output from an A/C electronic control unit, and the like.

The electronic control unit 40 is a so-called "microcomputer," comprising CPU, ROM, RAM, interface, etc., and processes the input signals using a program stored in the ROM. Further, the electronic control unit 40 outputs a drive signal to a starter, a fuel injection signal to a fuel injection valve, an ignition signal, a signal to a solenoid of an ON/OFF valve for controlling the shift operation of the automatic transmission 16, a signal to a solenoid of a linear solenoid valve for controlling the hydraulic pressure of the automatic transmission 16, a display signal to a shift position display unit, a signal to the ABS electronic control unit, a signal to the VSC/TRC electronic control unit, a signal to the A/C electronic control unit, and the like.

Figure 4:
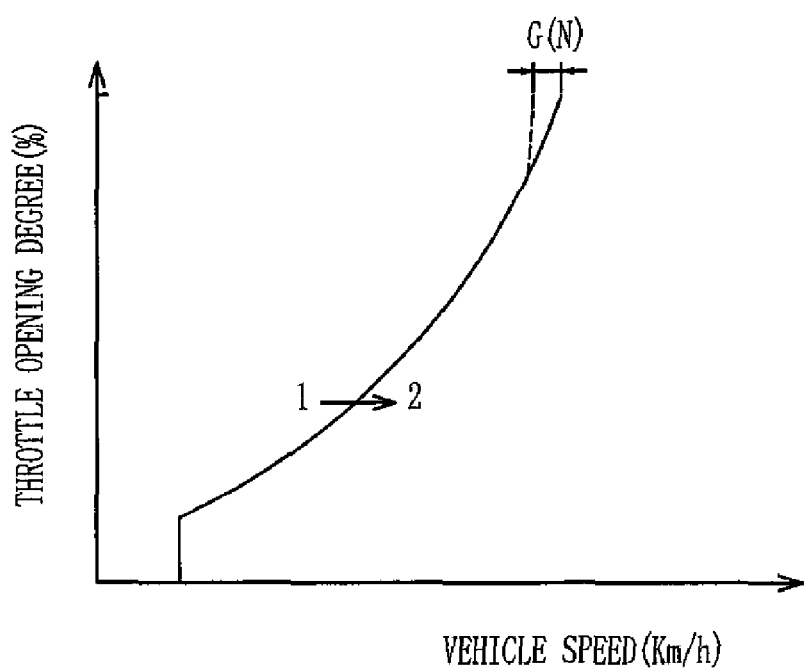
FIG. 4 is a graph illustrating a part of a shift diagram used in a shift control executed by the electronic control unit of FIG. 3.

The electronic control unit 40 determines a shift command by using a pre-stored shift diagram as shown in FIG. 4, based on a actual vehicle speed V, a accelerator operation amount θacc, or a throttle opening degree θth, and outputs a shift signal to thereby operate the shift control ON/OFF valve and execute a shift operation. For example, the maximum accelerator operation amount θaccmax on the 1→2 shift line in FIG. 4 is set such that, when a full throttle up-shift operation, which is the accelerator operation amount θacc or the throttle opening degree θth being fully open (100% or almost 100%) when driving on a level road, is executed, the maximum drive force (output power) of the vehicle can be obtained. Further, in order to output the maximum drive force of the vehicle when a full throttle up-shift operation is executed when driving with high variation in resistance to driving, for example, driving up or down a hill or towing, the electronic control unit 40 outputs a shift signal (executes a shift output) at an optimal point, such that the engine rotational speed NE approaches a high rotational speed within a range in which the engine rotational speed does not enter a preset red zone or a fuel cut zone, beyond the red zone. Alternatively, the electronic control unit 40 may change the preset shift pattern, and thus can execute a shift operation at an optimal point in a next full throttle upshift. Described in brief, the electronic control unit 40 controls a learning process for learning an optimal shift point, based on results of executed shifts.

Figure 5:
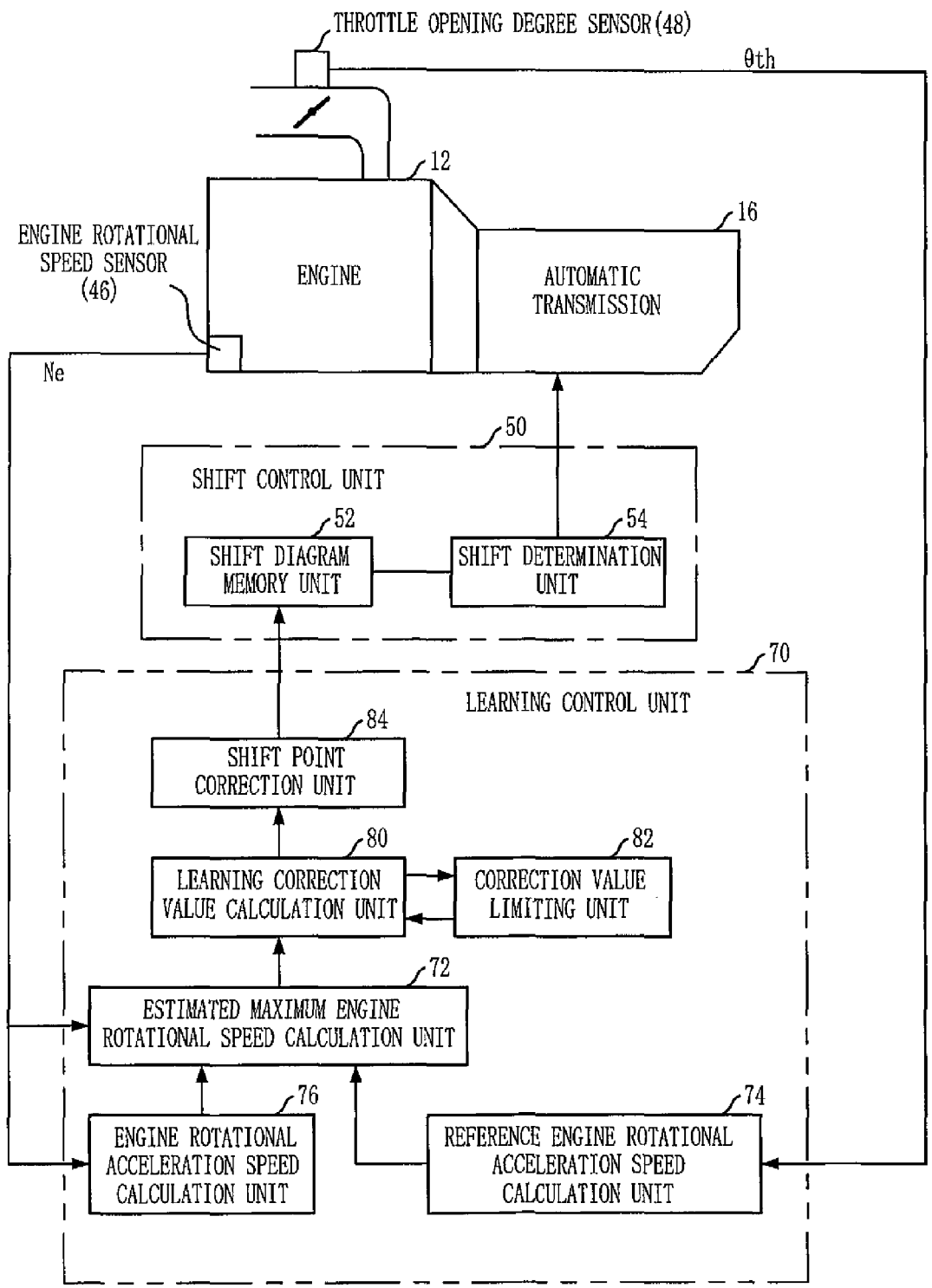
FIG. 5 is a functional block diagram illustrating main function parts controlled by the electronic control unit shown in FIG. 3.

FIG. 5 is a functional block diagram illustrating main function parts controlled by the electronic control unit 40. As shown in FIG. 5, the electronic control unit 40 comprises a shift control unit 50 and a learning control unit 70 in view of functionality. The shift control unit 50 comprises a shift diagram memory unit 52 pre-storing the shift diagram therein, and a shift determination unit 54 determining a shift command, based on vehicle driving conditions, for example, a actual vehicle speed V, a accelerator operation amount θacc, or a throttle opening degree θth, by using the shift diagram stored in the shift diagram memory unit 52, and outputs a shift signal to thereby operate a shift control ON/OFF valve and execute a determined shift operation.

The learning control unit 70 comprises an estimated maximum engine rotational speed calculation unit 72, which will be described later; a reference engine rotational acceleration rate calculation unit 74; an engine rotational acceleration rate calculation unit 76; a learning correction value calculation unit 80; a correction value limiting unit 82; and the like. The above-mentioned unit of the learning control unit 70 executes a learning process during a shift operation when actually driving, and corrects the shift diagram stored in the shift diagram memory unit 52, by using the results of learning. In other words, the learning control unit 70 estimates maximum engine rotational speed by replacing the maximum value of the engine rotational speed, after the upshift in power-on driving is executed, with a value in a reference driving state, which is not affected by the rotational acceleration rate of the engine. Thereafter, the learning control unit 70 calculates a learning correction value, based on the deviation between the estimated maximum engine rotational speed and a target maximum engine rotational speed.

The reference engine rotational acceleration rate calculation unit 74 calculates a value of engine rotational acceleration rate A2 (hereinbelow, referred to as reference engine rotational acceleration rate at an upshift point in the reference driving state by using a previously experimentally obtained and stored relationship, based on at least one of vehicle driving conditions, for example, the vehicle speed V, the throttle opening degree θth and the input torque Tin of the automatic transmission 16. The technical term "reference engine rotational acceleration rate" represents the rotational acceleration rate of the engine 12 when the vehicle drives in a reference driving state in which the vehicle as an empty vehicle with no of passengers and freight drives on a level road having a 0% inclination without affecting the acceleration of the vehicle. In the first embodiment, the reference engine rotational acceleration rate is the engine rotational acceleration rate A2 calculated from the vehicle driving conditions at the shift point in the reference driving state.

The engine rotational acceleration rate calculation unit 76 calculates the rotational acceleration rate A of the engine 12 at the shift point. In the first embodiment, the value of the engine rotational acceleration rate A may be obtained by calculating the variation dNE/dt in the engine rotational speed NE per unit time detected by an engine rotational speed sensor 46 installed in the engine 12, in succession. Further, because the engine rotational speed NE generally has high variation noise, it is preferred to filter the engine rotational speed NE, for example, the moving average of the engine rotational speed NE, using a smoothing filter (not shown) prior to using the engine rotational speed NE in the calculation of the engine rotational acceleration rate.

The estimated maximum engine rotational speed calculation unit 72 calculates an estimated maximum engine rotational speed NEc at the reference engine rotational acceleration rate A2. In detail, the estimated maximum engine rotational speed calculation unit 72 calculates the estimated maximum engine rotational speed NEc as defined in the following equation 1. (See FIG. 12)

$$NEc = NE1 + (NE2 - NE1) \times A2/A1 \qquad (1)$$

Where the reference engine rotational acceleration rate A2 has been calculated by the reference engine rotational acceleration rate calculation unit 74, the engine rotational acceleration rate A1 at the upshift point has been calculated by the engine rotational acceleration rate calculation unit 76, the rotational speed NE1 of the engine 12 at the upshift point) has been detected by the engine rotational speed sensor 46, and the NE2 is the rotational speed of the engine 12 at the inertia phase start point during an up-shift operation.

The operation of the correction value limiting unit 82 is appropriately executed during the operation of a learning correction value calculation unit 80, which will be described later herein. During the operation of the learning correction-value calculation unit 80, the correction value limiting unit 82 determines whether or not the shift point learning value ΔG for every cycle used by the learning correction value calculation unit 80 and/or the total value of learning G(N) fall (falls) outside of a predetermined reference range after learning is complete. When the learning values fall outside of the predetermined reference range, the learning values are limited so that it is not outside of the predetermined reference range. For example, the shift point learning value ΔG for every cycle is processed by the correction-value limiting unit 82 as follows. The shift point learning value ΔG for every cycle, which has been calculated by the learning correction value calculation unit 80, is given to the correction value limiting unit 82 before the value ΔG is used in a actual learning process. The correction-value limiting unit 82 determines whether the value ΔG is included within a range between two predetermined constants ΔGmin and ΔGmax (ΔGmin≦ΔG≦ΔGmax). In the above case, when the value ΔG exceeds the maximum value ΔGmax, the value ΔG is guarded to become ΔGmax (ΔG=ΔGmax). Further, when the value ΔG is less than the minimum value ΔGmin, the value ΔG is guarded to become ΔGmin (ΔG=ΔGmin). Alternatively, when the value ΔG is included within the range between ΔGmin and ΔGmax (ΔGmin≦ΔG≦ΔGmax), no further operation proceeds. After the guarding of the value ΔG, the guarded value ΔG is returned to the learning correction value calculation unit 80 and is used in a actual learning process. Meanwhile, the total amount of learning G(N) after learning is processed by the correction value limiting unit 82 as follows. After the total amount of learning G(N) after learning has been calculated by the learning correction value calculation unit 80, the value G(N) is given to the correction value limiting unit 82 before the value G(N) is used in a actual learning process. The correction value limiting unit 82 determines whether the value G(N) is included within a range between two predetermined constants Gmin and Gmax (Gmin≦G(N)≦Gmax). In the above case, when the value G(N) exceeds the maximum value Gmax, the value G(N) is guarded to become Gmax (G(N)=Gmax). Further, when the value G(N) is less than the minimum value Gmin, the value G(N) is guarded to become Gmin (G(N)=Gmin). Meanwhile, when the value G(N) is included within the range between Gmin and Gmax (Gmin≦G(N)≦Gmax), no further operation proceeds. The value G(N) proceeded as described above is returned to the learning correction value calculation unit 80, thereafter a shift point correction is performed.

In every shift operation, the learning correction-value calculation unit 80 calculates the deviation ΔNE between a target maximum engine rotational speed NEd and the estimated maximum engine rotational speed NEc, and executes a learning process according to the size of the deviation ΔNE, and thus corrects the shift point stored in the shift diagram memory unit 52. Here, the target maximum engine rotational speed NEd is a preset rotational speed, which is preset such that the rotational speed of the engine 12, at the time before or after the inertia phase start point in response to a shift operation, approaches the target maximum engine rotational speed NEd as possible, but does not exceed the target maximum engine rotational speed NEd. For example, the target maximum engine rotational speed NEd is set to a value lower than a fuel cut rotational speed NEfcut, which has been set to preserve the durability of the engine 12. Further, preferably, the engine rotational speed NEd may be set to a value lower than the minimum value NEred of the red zone of the rotational speed of the engine 12, which is lower than the fuel cut rotational speed.

In detail, first, the shift point learning value ΔG for every cycle is calculated by substituting the calculated deviation ΔNE in the relation, ΔG=K×ΔNE, wherein K is a predetermined learning correction coefficient for determining a learning weight. Thereafter, the shift point learning value ΔG for every cycle, which has been calculated by the learning correction value calculation unit 80 as described above, and guarded by the correction value limiting unit 82 as demanded, is added to the total amount of learning G(N-1), which has been obtained up to the previous shift operation, so that a new total amount of learning G(N) accumulated to this time is calculated (G(N)=G(N-1)+ΔG). Further, the new total amount of learning G(N) may be limited by the correction value limiting unit 82 when necessary.

A shift point correction unit 84 corrects the shift diagram stored in the shift diagram memory unit 52, based on the total amount of learning G(N), which has been calculated by the learning correction value calculation unit 80 and guarded by the correction value limiting unit 82 as demanded. The total amount of learning G(N) is used for correcting, for example, the shift line in FIG. 4 from a solid curve to a dotted curve, so that the upshift point, e.g., the 1→2 upshift point, may be corrected through learning. Therefore, in a full throttle upshift, it is possible to output maximum engine power even when the vehicle drives in a state of high variation in resistance to driving, such as when driving up or down a hill or when towing.

In the above state, the correction of the shift point is executed such that the shift point is moved toward a high vehicle speed side, as the deviation ΔNE between the estimated maximum engine rotational speed NEc and the target maximum engine rotational speed NEd is increased. The correction of the shift point in FIG. 4 is accompanied by a negative deviation ΔNE, in which the shift point is substantially moved from the original shift point to a low vehicle speed side. Further, the deviation ΔNE, which is given to the learning correction value calculation unit 80 during a learning step, is an engine rotational speed deviation. Further, the amount of learning ΔG for every cycle, which represents the one-time shift point learning value and is used in the practical learning, executed by the learning correction value calculation unit 80, and the amount of learning G(N), which is calculated by the learning correction value calculation unit 80 and is used in the correction of the shift point executed by the shift point correction unit 84, are vehicle speeds as shown in FIG. 4. As described above, although the maximum engine rotational speed deviation ΔNE, the amount of learning ΔG at one time, and the total amount of learning G(N) have different dimensions, they may be used to determine the learning weight using the learning correction coefficient K, or may be separately transformed through methods, which are not specifically defined in this description.

Figure 6:
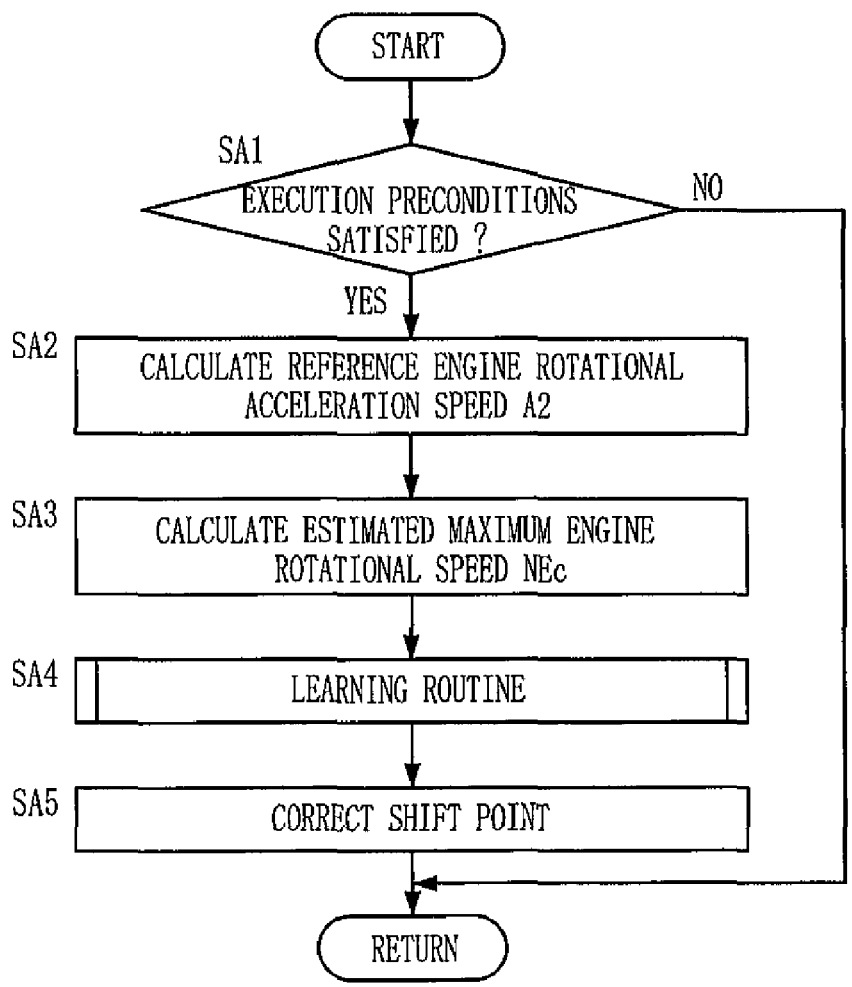
FIG. 6 is a flowchart illustrating main control operations of the electronic control unit shown in FIG. 3.

FIG. 6 is a flowchart illustrating a full throttle upshift point correction control process which is main control operations of the electronic control unit. As shown in FIG. 6, at step SA1 (hereinbelow, the technical term "step" is omitted from the step numbers), it is determined whether the execution preconditions for the routine have been satisfied. Examples of the execution preconditions for the routine are as follows: a fully open (100% or almost 100%) throttle opening degree θth; the heated state of the automatic transmission with the oil temperature Toil higher than a predetermined point; the heated state of the engine with the engine coolant temperature Tw higher than a predetermined point; the normal state of the engine rotational speed sensor; and normal states of hydraulic frictional engagement devices related to the full throttle upshift operation. When the determination in SA1 is negative, the learning of the shift point is not executed even though a shift operation is executed, and thus the process is ended. The reason for this ending is that the shift operation in this state is not normal, and thus erroneous learning results. Meanwhile, when the determination in SA1 is positive, SA2 is executed.

At SA2, corresponding to the reference engine rotational acceleration rate calculation unit 74, the reference engine rotational acceleration rate A2 is calculated. In other words, at SA2, the reference engine rotational acceleration rate A2 at the upshift point is calculated by using a previously experimentally obtained and stored relationship, based on at least one of the vehicle driving conditions, for example, the vehicle speed V, the throttle opening degree θth and the input torque Tin of the automatic transmission 16.

At SA3, corresponding to the estimated maximum engine rotational speed calculation unit 72, an estimated maximum engine rotational speed NEc is estimated. In other words, at SA3, the estimated maximum engine rotational speed NEc is estimated by applying A2, NE2, NE1, and A1 in the above-mentioned equation 1. Wherein the reference engine rotational acceleration rate A2 has been calculated at SA2, the rotational speed NE1 of the engine 12 at the shift point has been detected by the engine rotational speed sensor 46, the NE2 is the rotational speed of the engine 12 at the inertia phase start point, and A1 is engine rotational acceleration rate at the shift point of engine rotational acceleration rate which has been selected from engine rotational acceleration rates sequentially calculated by the engine rotational acceleration rate calculation unit 76 using the detected engine rotational speed NE. Further, as described above, since the engine rotational speed NE generally has high variation (noise), it is preferred to filter the engine rotational speed NE, for example, the moving average of the engine rotational speed NE, using a smoothing filter (not shown) prior to using the engine rotational speed NE in the calculation of the estimated maximum engine rotational speed NEc.

Figure 7:
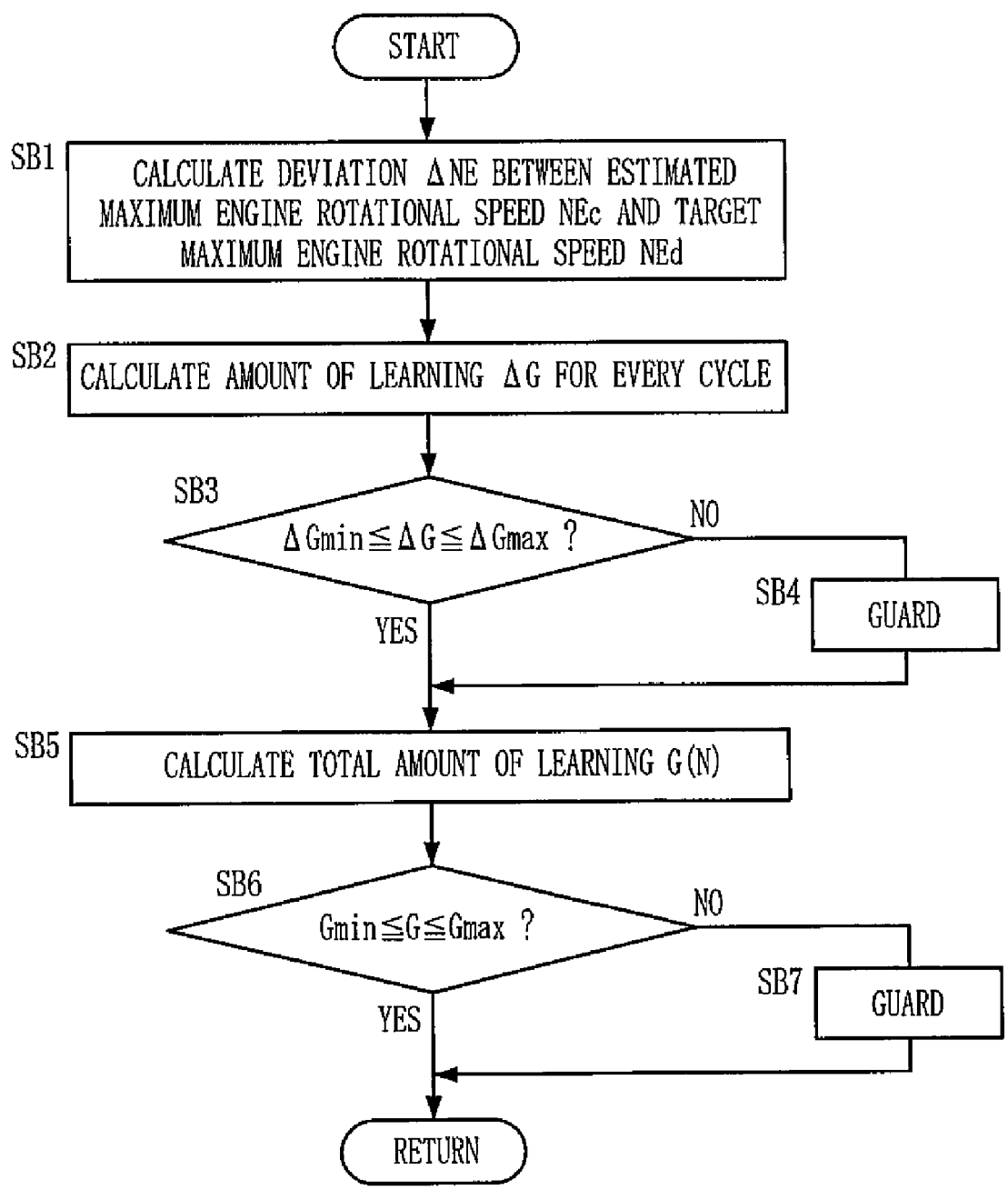
FIG. 7 is a flowchart of a learning routine of the step SA4 shown in FIG. 6.

SA4 corresponds to the learning correction value calculation unit 80. At SA4, the learning routine of FIG. 7 is executed. In the flowchart of FIG. 7, at SB1, deviation ΔNE between the estimated maximum engine rotational speed NEc estimated at SA3 and a preset target maximum engine rotational speed NEd is calculated. Thereafter, at SB2, a shift point amount of learning ΔG for every cycle is determined, based on the deviation ΔNE calculated at SB1. Here, the shift point amount of learning ΔG for every cycle is determined from the relation, ΔG=K×ΔNE, wherein K is a predetermined learning correction coefficient for determining a learning weight.

Subsequent SB3 and SB4 correspond to the correction value limiting unit 82. First, at SB3, it is determined whether or not the amount of learning ΔG for every cycle determined at SB2 exceeds the range between two predetermined constants ΔGmin and ΔGmax (ΔGmin≦ΔG≦ΔGmax). When the amount of learning ΔG for every cycle falls outside of the range, SB4 is executed to guard the value ΔG. Meanwhile, when the determination in SB3 is positive, the determined value ΔG is used in the learning without guarding the value ΔG (ΔG'=ΔG), and the process progresses to SB6. At SB4, when the value ΔG exceeds the maximum value ΔGmax, the value ΔG is guarded to make ΔG=ΔGmax; alternatively, when the value ΔG is less than the minimum value ΔGmin, the value ΔG is guarded to make ΔG=ΔGmin.

At SB5, the value ΔG', which has been calculated as described above, is added to the total amount of learning G(N−1), which has been obtained until the last time shift operation, so that a new total amount of learning G(N) added with the amount of learning at this time is calculated. In other words, the total amount of learning G(N) after this learning is expressed by the relation, G(N)=G(N−1)+ΔG'.

Subsequent SB6 and SB7 correspond to the correction value limiting unit 82. In other words, at SB6, it is determined whether or not the total amount of learning G(N) exceeds a range between two predetermined constants Gmin and Gmax (Gmin≦G(N)≦Gmax). When the determination in SB6 is negative, which represents that the value G(N) falls outside of the range, the process progresses to SB7. However, when the determination in SB6 is positive, the total amount of learning G(N) calculated at SB6 is recognized as the results of learning, and the routine is ended. At SB7, when the value G(N) exceeds the maximum value Gmax, the value G(N) is guarded to thus become Gmax (G(N)=Gmax). When the value G(N) is less than the minimum value Gmin, the value G(N) is guarded to thus become Gmin (G(N)=Gmin). After the guarding, the guarded value G(N) is recognized as the results of learning, and the routine is ended.

Return to FIG. 6, at SA5 corresponding to the shift point correction unit 84, the shift diagram stored in the shift diagram memory unit 52 is corrected, based on the total amount of learning G(N), which has been obtained up to the conclusion of the learning routine (FIG. 7) of SA4, and the process of the flowchart of FIG. 6 is ended.

Figure 8:
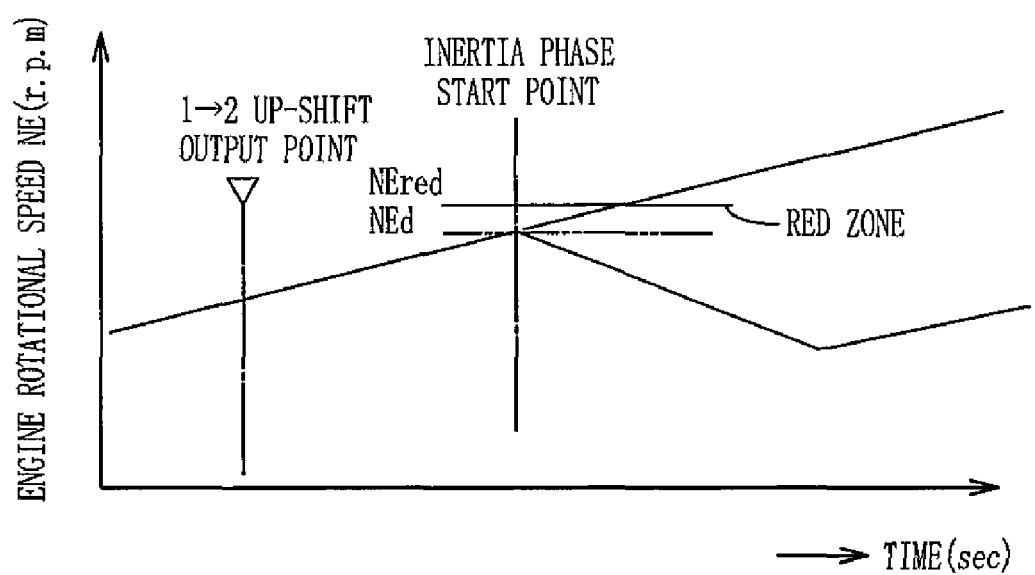
FIG. 8 is a graph illustrating main control operations of the electronic control unit shown in FIG. 3.
Figure 9:
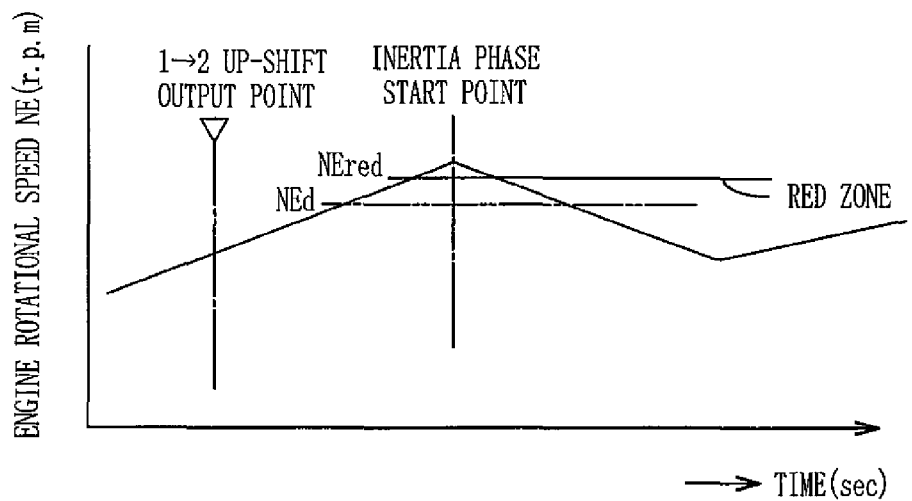
FIG. 9 is a graph illustrating main control operations of the electronic control unit shown in FIG. 3.
Figure 10:
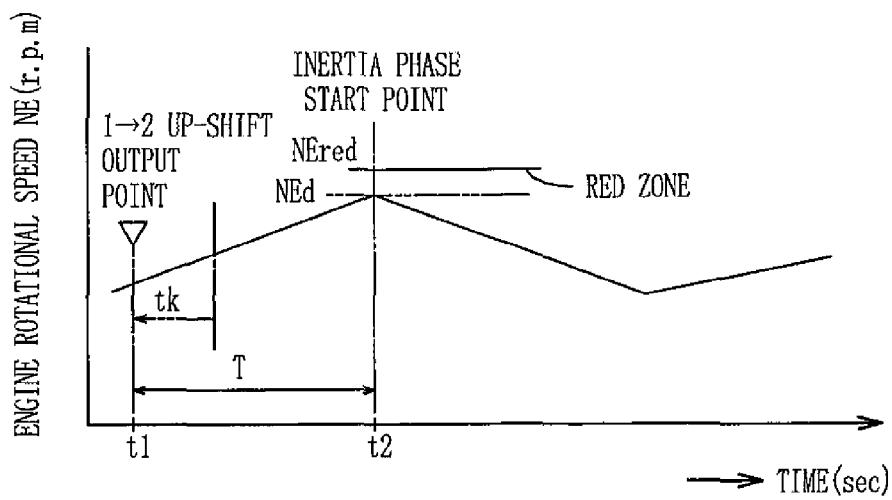
FIG. 10 is a graph illustrating main control operations of the electronic control unit shown in FIG. 3.

As described above, according to the first embodiment, the estimated maximum engine rotational speed NEc is estimated by the estimated maximum engine rotational speed calculation unit 72, based on at least the relationship between the reference engine rotational acceleration rate A2, calculated by the reference engine rotational acceleration rate calculation unit 74 (SA2), and the engine rotational acceleration rate A1 at the up-shift point, calculated by the engine rotational acceleration rate calculation unit 76. Further, the learning control for the total amount of learning, which is the learning correction value, is executed based on the deviation ΔNE between the estimated maximum engine rotational speed NEc, which is estimated both by the learning correction value calculation unit 80 and by the correction value limiting unit 82 (SA4), and the target maximum engine rotational speed NEd at the up-shift point. Because the shift point is corrected, based on the learning correction value, full throttle upshift is executed based on the shift point. Thus, when the shift output is executed, an optimal full throttle up-shift operation may be executed even when the vehicle drives in a state in which there is high variation in resistance to driving, such as when driving up or down a hill or performing towing. FIG. 8 through FIG. 10 are graphs illustrating the engine rotational speed NE in 1→2 full throttle up-shift operations, wherein FIG. 8 shows conventional operation on a level road, FIG. 9 shows conventional operation on a downhill road, and FIG. 10 shows the operation of the present embodiment on the downhill road. In the related art, when a vehicle drives downhill, the engine rotational speed NE tends to increase, compared to when driving along a level road, so that the shift time is reduced. Thus, as shown in FIG. 9, the engine rotational speed NE at the inertia phase start point in the full throttle upshift of the related art undesirably exceeds the target maximum engine rotational speed NEd, and further, exceeds the minimum value NEred of the rotational speed red zone. However, the first embodiment of the present invention executes the learning of the shift point, based on the deviation ΔNE between the estimated maximum engine rotational speed NEc which is the engine rotational speed in the reference driving state and the target maximum engine rotational speed NEd. Further, the first embodiment corrects the shift point, based on the results of learning, so that, when driving on a downhill road, the 1→2 shift determination is executed at a point advanced by tk corresponding to the correction of the shift point, based on the results of learning. Thus, in the first embodiment of the present invention, as shown in FIG. 10, the engine rotational speed NE at the inertia phase start point does not exceed the target maximum engine rotational speed NEd.

Figure 11:
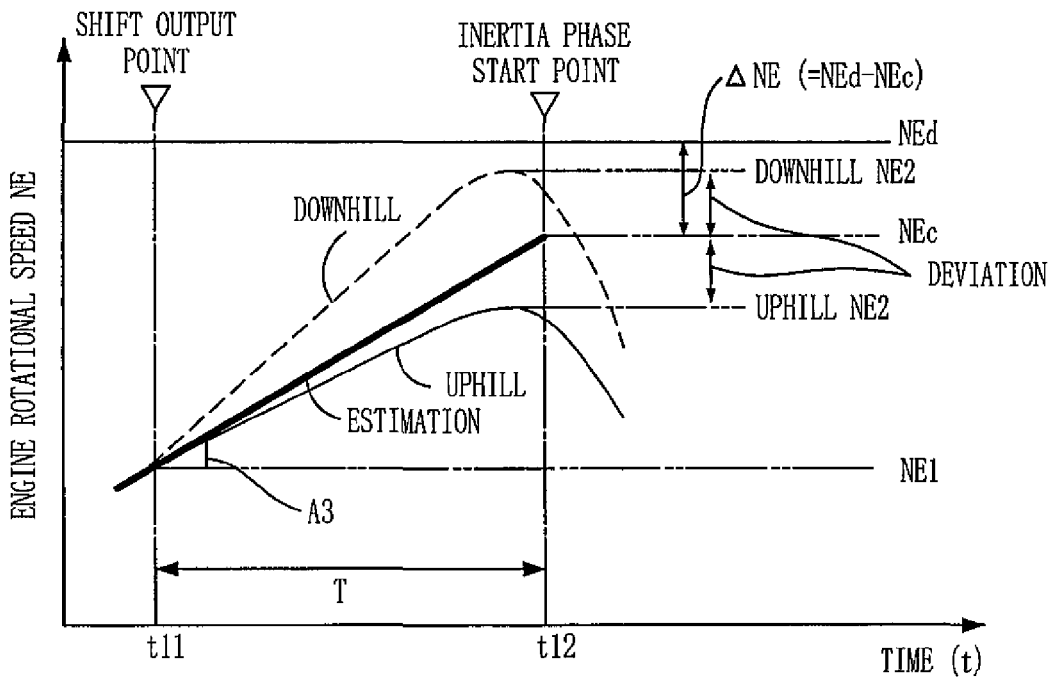
FIG. 11 is a graph illustrating main control operations of the electronic control unit shown in FIG. 3.
Figure 12:
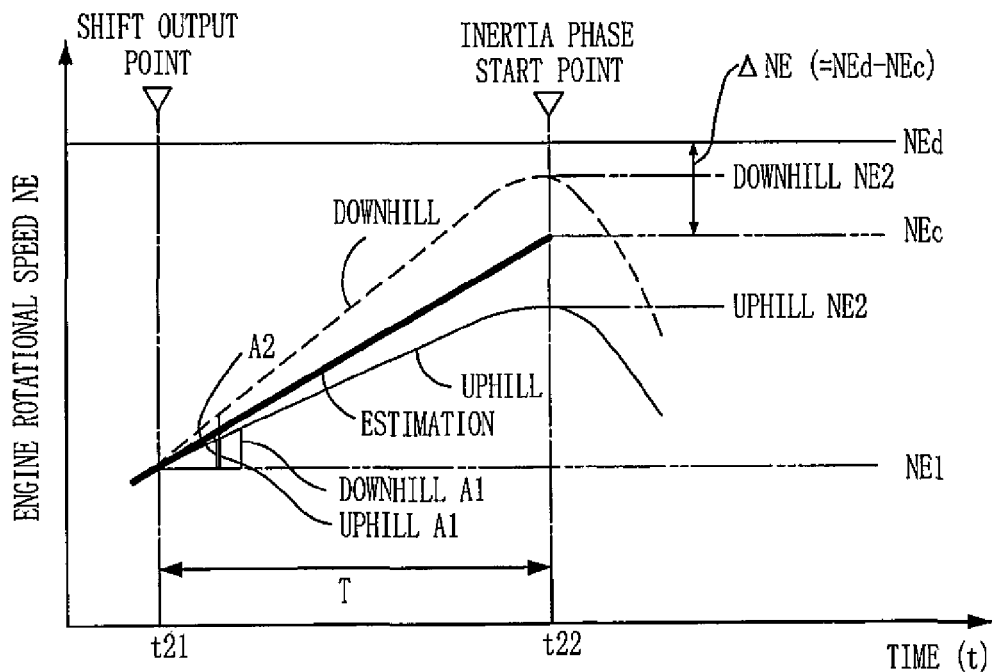
FIG. 12 is a graph illustrating main control operations of the electronic control unit shown in FIG. 3.

FIG. 11 and FIG. 12 are graphs illustrating the relationship between the time t and the engine rotational speed when an upshift is executed in a state in which an accelerator fully depressed or nearly fully depressed, in the automatic transmission 16 of the vehicle. Further, FIG. 11 and FIG. 12 illustrate the concept of learning the shift point according to the related art and to the first embodiment of the present invention, respectively. In the drawings, the solid lines are related to shift operations executed while the vehicle is driving in a highly loaded state, for example, when driving up a hill or when performing towing. The dotted lines are related to shift operations executed while the vehicle is driving along a downhill road. FIG. 11 shows an upshift operation according to the related art, for example, an upshift executed according to the method described in Japanese Patent Application Publication No. JP-A-2004-316845. Described in detail, as shown in FIG. 11, a designed engine rotational acceleration rate A3 during a time period from the upshift point t11 to the inertia phase start point t12 is calculated and the time period T (t12–t11) from the upshift point t11 to the inertia phase start point t12 is calculated based on the relationship between the designed engine rotational acceleration rate A3 and experimentally obtained values. Further, the engine rotational speed NEc at the inertia phase start point t12 is estimated by substituting the designed engine rotational acceleration rate A3 and the engine rotational speed NE1 at the shift point t11 in the relationship NEc=T×A3+NE1. Thereafter, the learning of the shift point is executed based on a deviation ΔNE between the estimated engine rotational speed NEc and a preset target maximum engine rotational speed NEd. In the method of FIG. 11, the designed engine rotational acceleration rate A3 at the shift point t11 is used in the process of estimating the engine rotational speed NE2 at the inertia phase start point t12.

When the engine accelerates while a vehicle drives in a highly loaded state, the increase in the engine rotational speed is lower than the increase in engine rotational speed in the reference driving state. For example, the engine rotational speed in the above state may become equal to the engine rotational speed NE, which can be attained when driving up a hill, as shown by the solid line in FIG. 11. Further, when the engine is accelerated when driving along a downhill road, the increase in the engine rotational speed is higher than the increase in the engine rotational speed when in a reference driving state. For example, the engine rotational speed in the above state may become equal to the engine rotational speed NE, which can be obtained when driving downhill, as shown by the dotted line in FIG. 11. In the above case, a substantial gap is defined between the estimated engine rotational speed NEc and the actual engine rotational speed NE2. The gap between the estimated engine rotational speed NEc and the actual engine rotational speed NE2 increases as the vehicle load increases or the inclination of the road increases. When the results of the above-mentioned shift operation of the related art are learned, the learning precision is reduced, so that there may occur an error in the determination of a subsequent shift operation.

As shown in FIG. 12, which is related to the first embodiment, the reference engine rotational acceleration rate A2 in the reference driving state of a vehicle is calculated using the throttle opening degree θth at a shift point t21. Thereafter, an estimated maximum engine rotational speed NEc at the reference engine rotational acceleration rate A2 at an inertia phase start point t22 is estimated based on the relationship between the calculated reference engine rotational acceleration rate A2 and actual engine rotational acceleration rate A1 at the shift point t21. Further, the learning of the shift point is executed based on deviation ΔNE between a target maximum engine rotational speed NEd and the estimated maximum engine rotational speed NEc. When the learning of the shift point is executed as described above and the same reference engine rotational acceleration rates A2 are provided, it is possible to attain the same estimated maximum engine rotational speed NEc in a changed reference driving state, although the estimated maximum engine rotational speed may have different values according to the inclination of the road surface and the load of a vehicle, as shown by the solid line and the dotted line in FIG. 12. Thus, even when a shift operation is executed in a highly loaded state such as driving uphill or towing, or in a state driving along a downhill road, the learning precision is increased by the learning of the results of the shift operation. Further, because the precision of convergence to the target maximum engine rotational speed is increased, it is possible to prevent the engine rotational speed from exceeding the target maximum engine rotational speed NEd.

Further, according to the first embodiment, the rotational speed NE of the engine 12 may be estimated by the estimated maximum engine rotational speed calculation unit 72. Further, the engine rotational acceleration speed A, which may be calculated by the reference engine rotational acceleration speed calculation unit 74 or by the engine rotational acceleration speed calculation unit 76, is the rotational acceleration rate A of the engine 12. Because the engine rotational acceleration rate A is an increase in the rotational speed NE of the engine 12 per unit time, the value of the engine rotational acceleration rate A can be easily detected or easily calculated by the engine rotational speed sensor 46.

Further, according to the first embodiment, the shift operation is the full throttle upshift, which is an upshift executed by the automatic transmission in response to the requirement to output the maximum power of the engine 12. Thus, particularly in a WOT (wide open throttle) shift, in which the maximum engine rotational speed NE2 during the shift is required to follow the target maximum engine rotational speed NEd, it is possible to prevent the upshift from being executed before the maximum engine rotational speed NE2 has approached the target maximum engine rotational speed Ned, or to prevent the upshift from being executed when the engine rotational speed NE continuously exceeds an allowable maximum value, thus allowing a user to use the automatic transmission with comfort.

A second embodiment of the present invention will be described below. Like reference numerals denote like elements described in embodiments of the present invention and, for the sake of convenience, descriptions for the like elements will be omitted.

Figure 13:
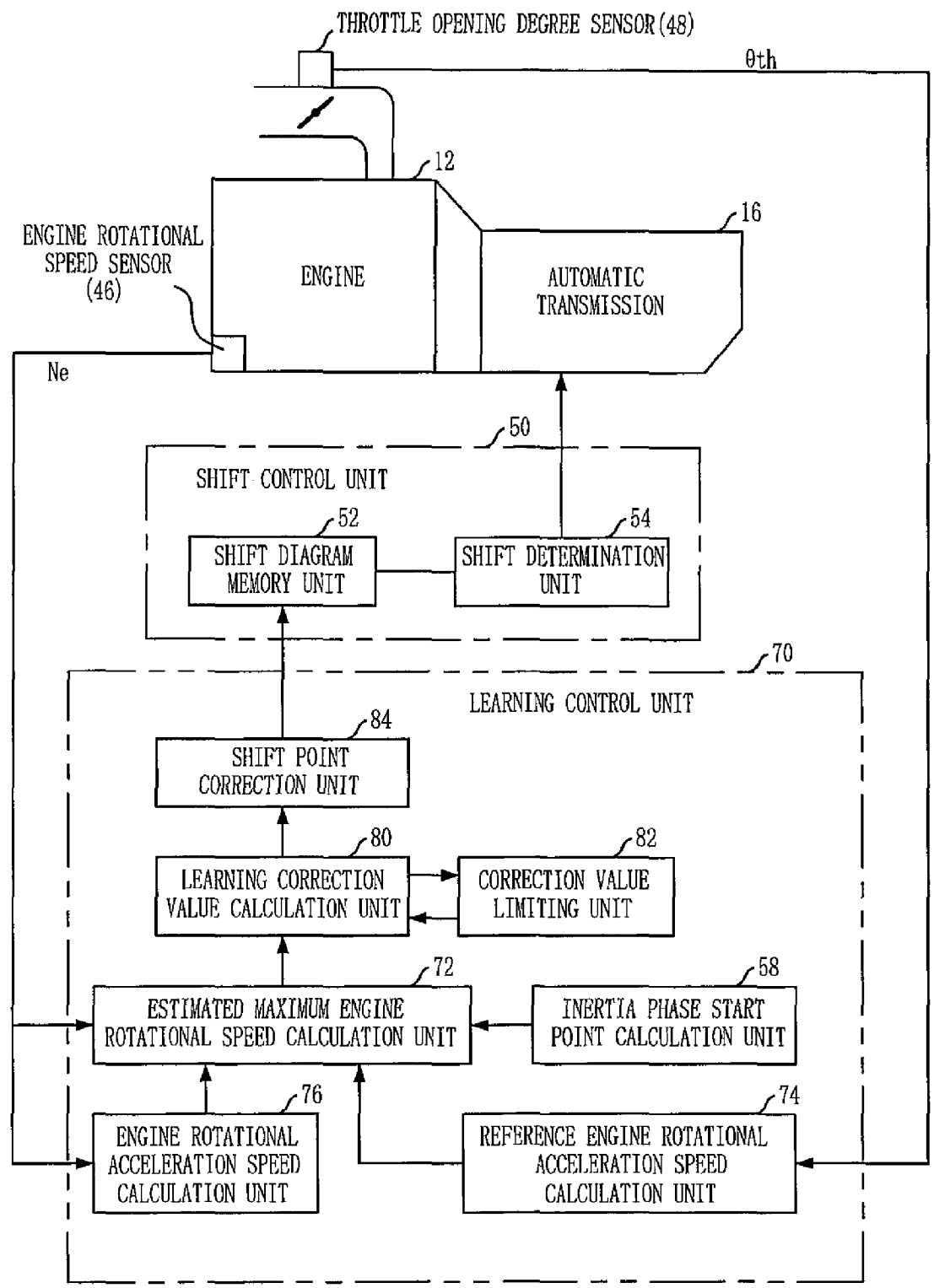
FIG. 13 is a functional block diagram illustrating main function parts controlled by an electronic control unit according to a second embodiment of the present invention, wherein FIG. 13 corresponds to FIG. 5.

FIG. 13 is a functional block diagram illustrating main function parts controlled by an electronic control unit 40 according to a second embodiment of the present invention, wherein FIG. 13 corresponds to FIG. 5. When FIG. 13 is compared to FIG. 5, FIG. 13 is different from FIG. 5 in that an inertia phase start point calculation unit 58 is included in the electronic control unit. Further, the estimated maximum engine rotational speed calculation unit 72 of the second embodiment is different from that of the first embodiment.

When it is determined that an upshift, for example, the 1→2 upshift, has been started at this time by using a previously experimentally obtained and stored relationship, based on at least one of vehicle driving conditions, for example, a vehicle speed V, a throttle opening degree θth and an input torque Tin of an automatic transmission 16, the inertia phase start point calculation unit 58 sequentially calculates an inertia phase start time period T required from a shift point of the up-shift to an inertia phase start point. The relationship is pre-stored in a memory unit in the form of a function or in the form of a map, for example, the relationship may be expressed by the function, $T=f(\mu, V, \theta th, Tin)$. In other words, the inertia phase of the upshift represents a zone in which the engine rotational speed NE varies according to the progress of the upshift. The inertia phase start time period T is reduced as the variables of the hydraulic frictional engagement devices related to the upshift, for example, the coefficient μ of friction of the brake B1 in the 1→2 upshift, the vehicle speed V, the throttle opening degree θth and the input torque Tin of the automatic transmission 16 increase. The coefficient μ of friction may be a constant, or may be a mathematical function of the oil temperature Toil. Further, the vehicle speed V, the throttle opening degree θth, and the input torque Tin of the automatic transmission 16 are related to a transmission torque added to the hydraulic frictional engagement devices, so that at least one of them may be used as a variable.

The estimated maximum engine rotational speed calculation unit 72 calculates an estimated maximum engine rotational speed NEc at the reference engine rotational acceleration rate A2 calculated by the reference engine rotational acceleration speed calculation unit 74. In detail, the estimated maximum engine rotational speed calculation unit 72 calculates the estimated maximum engine rotational speed NEc as defined in the following equation 2.

$$NEc=NE1+(T\times A3)\times (A2/A1) \quad (2)$$

Where the reference engine rotational acceleration speed A2 is calculated by the reference engine rotational acceleration speed calculation unit 74, the T is the time period required from the shift output point (shift point) calculated by the inertia phase start point calculation unit 58 to the inertia phase start point, A3 is the designed engine rotational acceleration speed from the shift output point (shift point) to the inertia phase start point, the engine rotational acceleration speed A1 at the shift output point (shift point) has been calculated by the engine rotational acceleration speed calculation unit 76, and the rotational speed NE1 of the engine 12 at the shift output point (shift point) has been detected by the engine rotational speed sensor 46.

Further, in the second embodiment, the electronic control unit 40 executes the same operation as that described for the flowcharts of the first embodiment of FIGS. 6 and 7. The functional difference between the second embodiment and the first embodiment of FIG. 6 while executing SA3, is as follows.

At SA3, corresponding both to the inertia phase start point calculation unit 58 and to the estimated maximum engine rotational speed calculation unit 72, the time period T required from the shift point to the inertia phase start point, is calculated, and the estimated maximum engine rotational speed NEc is estimated based on the calculated time period T. In other words, at SA3, the time period T required from the shift point to the inertia phase start point is first calculated. Thereafter, the estimated maximum engine rotational speed NEc is estimated by applying the calculated time period T, A2, NE1, and A1 in the above-mentioned equation 2. Wherein the reference engine rotational acceleration speed A2 has been calculated at SA2, the rotational speed NE1 of the engine 12 at the shift point has been detected by the engine rotational speed sensor 46, A3 is the designed engine rotational acceleration speed from the shift point to the inertia phase start point, and A1 is the engine rotational acceleration speed at the shift point of the engine rotational acceleration speeds sequentially calculated by the engine rotational acceleration speed calculation unit 76 using the detected engine rotational speed NE. Further, as described above for the first embodiment, the engine rotational speed NE generally has high variation noise, so that it is preferred to filter the engine rotational speed NE, for example, the moving average of the engine rotational speed NE, using a smoothing filter (not shown) prior to using the engine rotational speed NE in the calculation of the estimated maximum engine rotational speed NEc.

Further, the functional parts of the electronic control unit 40 of FIG. 13 and the steps in the process of the second embodiment corresponding to the process, expressed by the flowcharts of FIG. 6 and FIG. 7, remain the same as those of the first embodiment, except for the inertia phase start point calculation unit 58 and the step SA3, and further explanation is thus deemed unnecessary.

According to the second embodiment, the estimated maximum engine rotational speed calculation unit 72 (SA3) calculates the increase NE2−NE1 in the engine rotational speed from the shift point to the inertia phase start point, based at least on both the time period T, required from the shift point to the inertia phase start point, and the reference engine rotational acceleration speed A2 in the reference driving state. Thus, the estimated maximum engine rotational speed calculation unit 72 (SA3) of the second embodiment determines the estimated maximum engine rotational speed NEc without executing actual measurement of the engine rotational speed NE2 until the inertia phase start point.

Figure 14:
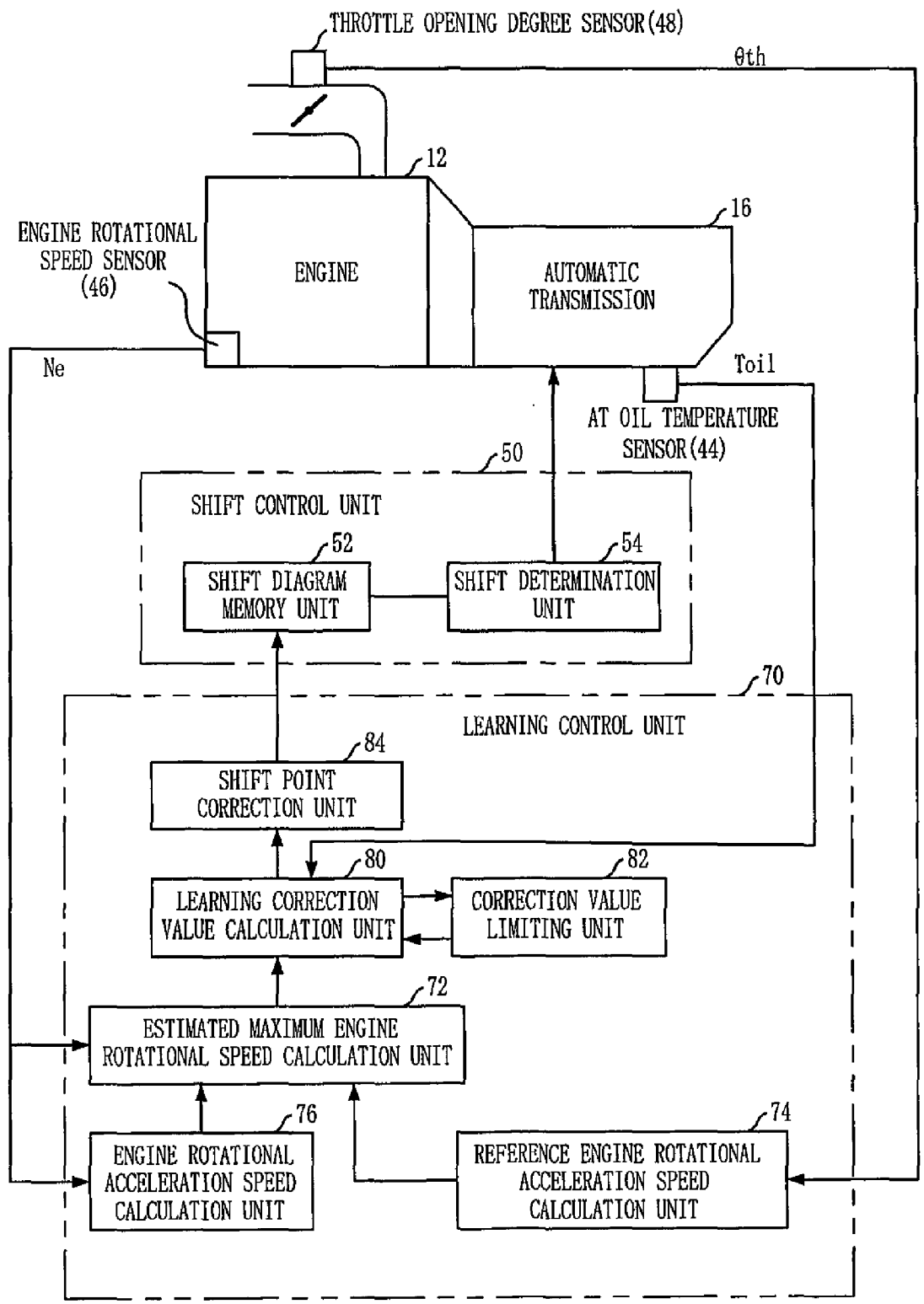
FIG. 14 is a functional block diagram illustrating main function parts controlled by an electronic control unit according to a third embodiment of the present invention, wherein FIG. 14 corresponds to FIG. 5.
Figure 15:
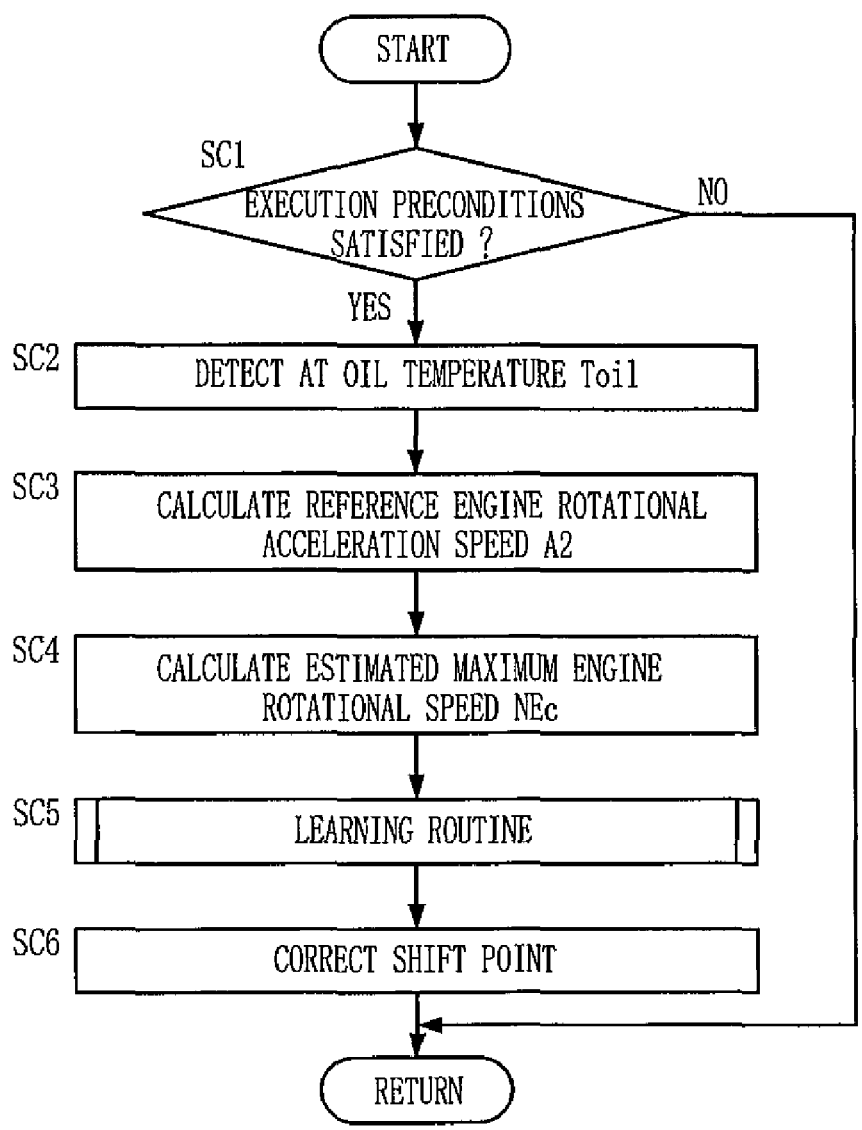
FIG. 15 is a flowchart illustrating main control operations of the electronic control unit according to the embodiment of FIG. 14, wherein FIG. 15 corresponds to FIG. 6.

FIG. 14 is a functional block diagram illustrating main function parts controlled by an electronic control unit 40 according to a third embodiment of the present invention, wherein FIG. 14 corresponds to FIG. 5. FIG. 15 is a flowchart illustrating main control operations of the electronic control unit 40 according to the embodiment of FIG. 14, wherein FIG. 15 corresponds to FIG. 6.

Unlike the block diagram of FIG. 5, in the block diagram of FIG. 14, an oil temperature Toil (hereinbelow, sometimes referred to "AT oil temperature") is applied from an AT oil temperature sensor 44 to the learning correction value calculation unit 80. At every shift operation, the learning correction value calculation unit 80 calculates the deviation ΔNE between the estimated maximum engine rotational speed NEc, which has been determined by the estimated maximum engine rotational speed calculation unit 72, and a preset target maximum engine rotational speed NEd. Further, a learning process is executed to correct the shift point according both to the size of the deviation ΔNE and to the AT oil temperature Toil of the automatic transmission 16, which has been detected during the shift operation, for example, at the shift point. Thereafter, the shift diagram, which is stored in the shift diagram memory unit 52, is corrected based on the learning results.

In detail, first, the shift point learning value ΔG for every cycle is calculated by substituting the calculated deviation ΔNE in a relation, ΔG=K×ΔNE, wherein K is a predetermined learning correction coefficient for determining a learning weight. Thereafter, the shift point learning value ΔG for every cycle, which has been calculated as described above and is limited by the correction value limiting unit 82 as demanded, is added to the total amount of learning, which has been obtained up to the last time shift operation, so that a new total amount of learning added with the amount of learning at this time is calculated. In this case, the operation of the learning correction value calculation unit 80 remains the same as that of the first embodiment. Meanwhile, the learning correction-value calculation unit 80 of the third embodiment is provided with a plurality of total amounts of learning, which have been divided by the AT oil temperature Toil. For example, there may be provided three total amounts of learning, which are Glow(N) when Toil<T1; Gmid(N) when T1≦Toil<T2; and Ghigh(N) when T2≦Toil, wherein Toil is the AT oil temperature, and T1, T2 are predetermined reference temperatures (T1<T2). Further, for the determination of any one (hereinbelow, simply referred to as "G(N)") among the three total amounts of learning: Glow(N), Gmid(N) and Ghigh(N) according to the value of the AT oil temperature Toil, measured by the AT oil temperature sensor 44 at the shift point or at the time very near the shift point, the calculated ΔG' is added to the total amount of learning G(−1), which has been obtained up to the previous shift operation, so that a new total amount of learning G(N) accumulated up to that time is calculated (G(N)=G(N−1)+ΔG'). Further the new total amount of learning G(N) may be limited by the correction-value limiting unit 82 when necessary. Thereafter, the shift diagram, which is stored in the shift diagram memory unit 52, is corrected based on the total amount of learning G(N), which has been calculated as described above and limited by the correction-value limiting unit 82 as demanded. In other words, the total amount of learning G(N) is used for correcting, for example, the shift line in FIG. 4 from the solid curve to the dotted curve, so that the upshift point, for example, the 1→2 upshift point, can be corrected through learning. Therefore, in a full throttle upshift, it is possible to output maximum engine power even when a vehicle drives in a state of high variation in resistance to driving, such as when driving up or down a hill or performing towing.

Unlike the process of the flowchart of FIG. 6, in the process of the flowchart of FIG. 15, SC2 is executed between SC1, which corresponds to SA1 in the flowchart of FIG. 6, and SC3, which corresponds to SA2 in the flowchart of FIG. 6. In the third embodiment, the AT oil temperature Toil of the automatic transmission 16 is required at SC5, which corresponds to the learning correction value calculation unit 80, so that, at SC2, the AT oil temperature Toil of the automatic transmission 16 is measured, for example, at the shift point.

Figure 16:
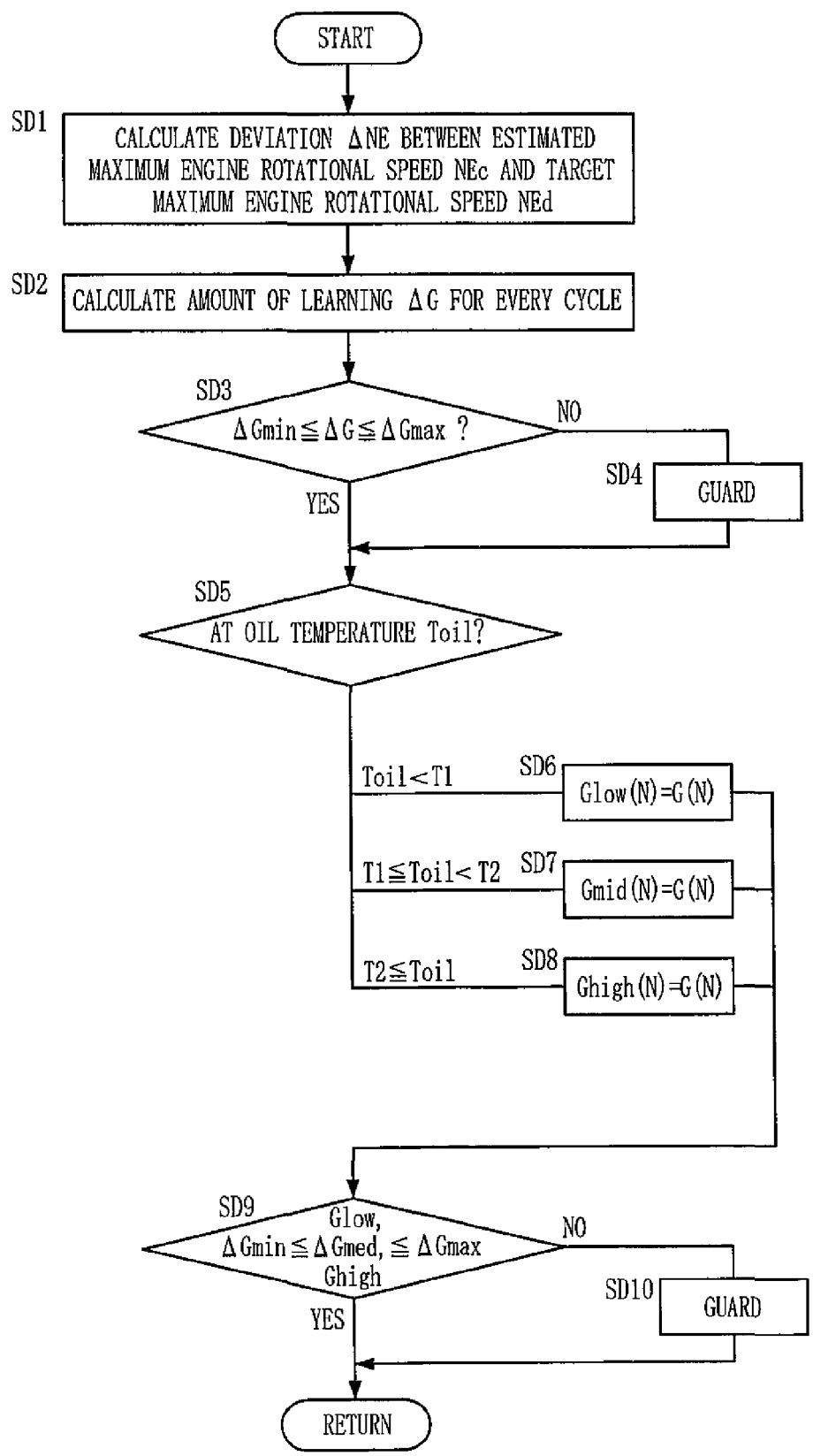
FIG. 16 is a flowchart showing a learning routine of the step SC5 shown in FIG. 15, wherein FIG. 16 corresponds to FIG. 7.

At SC5 corresponding to the learning correction value calculation unit 80, the learning routine shown in FIG. 16 is executed. The flowchart of FIG. 16 corresponds to the flowchart of FIG. 7, wherein SD1 to SD4 of FIG. 16 correspond to SB1 to SB4 of FIG. 7. Thus, further explanation for SD1 to SD4 of FIG. 16 is deemed unnecessary. Further, SD5 to SD8 of FIG. 16 correspond to SB5 of FIG. 7, while SD9, SD10 of FIG. 16 correspond to SB6, SB7 of FIG. 7, respectively.

At SD5, the AT oil temperature Toil, which has been measured at SC2 of FIG. 15, is compared to reference temperatures. For example, the AT oil temperature Toil is compared to the predetermined reference temperatures T1, T2; T1<T2, thus determining the relationship between Toil and T1 and T2, that is, determining whether Toil<T1, T1≦Toil<T2 or T2≦Toil. When Toil<T1, SD6 is executed, when T1≦Toil<T2, SD7 is executed, and when T2≦Toil, SD8 is executed.

At SD6, which is executed when Toil<T1, to determine the total amount of learning Glow(N) and thus learn the shift operations executed at the AT oil temperature Toil, the calculated ΔG' is added to the total amount of learning Glow(N−1), which has been obtained up to the last time shift operation, so that a new total amount of learning Glows), accumulated up to this time, is calculated (Glow(N)=Glow(N−1)+ΔG'). Further, at SD7, which is executed when T1≦Toil≦T2, the total amount of learning Gmid(N) is calculated, while at SD8, which is executed when T2≦Toil, the total amount of learning Ghigh(N) is calculated in the same manner as that of SD6.

SD9 and SD10 correspond to the correction value limiting unit 82. At SD9, it is determined whether any one (hereinbelow, referred to simply as "G(N)") among the total amounts of learning, which are Glow(N), Gmid(N) and Ghigh(N), learned at SD6 through SD8, respectively, is included within the predetermined range (Gmin≦G(N)≦Gmax). When the determination in SD9 is positive, which represents that the value G(N) is included within the predetermined range, and thus the values G(N) calculated at SD6, SD7 and SD8 are recognized as the results of learning and the routine is ended. However, when the determination in SD9 is negative, which represents that the value G(N) falls outside of the predetermined range, SD10 is executed.

At SD10, when the value G(N) exceeds the maximum value Gmax, the value G(N) is guarded, to thus make G(N)=Gmax. However, when the value G(N) is less than the minimum value Gmin, the value G(N) is guarded, to thus make G(N)=Gmin. After the guarding of the value G(N), the value G(N) is recognized as the results of learning and the routine is ended.

Returning to FIG. 15, at SC6, which corresponds to the shift point correction unit 84, the shift diagram, which is stored in the shift diagram memory unit 52, is corrected based on the total amount of learning G(N) after learning, which has been obtained up to the conclusion of the learning routine at SC5 according to the AT oil temperature Toil of the automatic transmission 16, and the process of this flowchart is ended. Further, SC1 SC3 and SC4 are equal to SA1, SA2 and SA3 of the first embodiment, and further explanation is not deemed necessary.

According to the third embodiment, the learning correction value calculation unit 80 (SC5) executes the learning while considering the AT oil temperature Toil of the automatic transmission 16. Further, the shift point can be corrected according to the oil temperature Toil by the shift point correction unit 84 (SC6).

Figure 18:
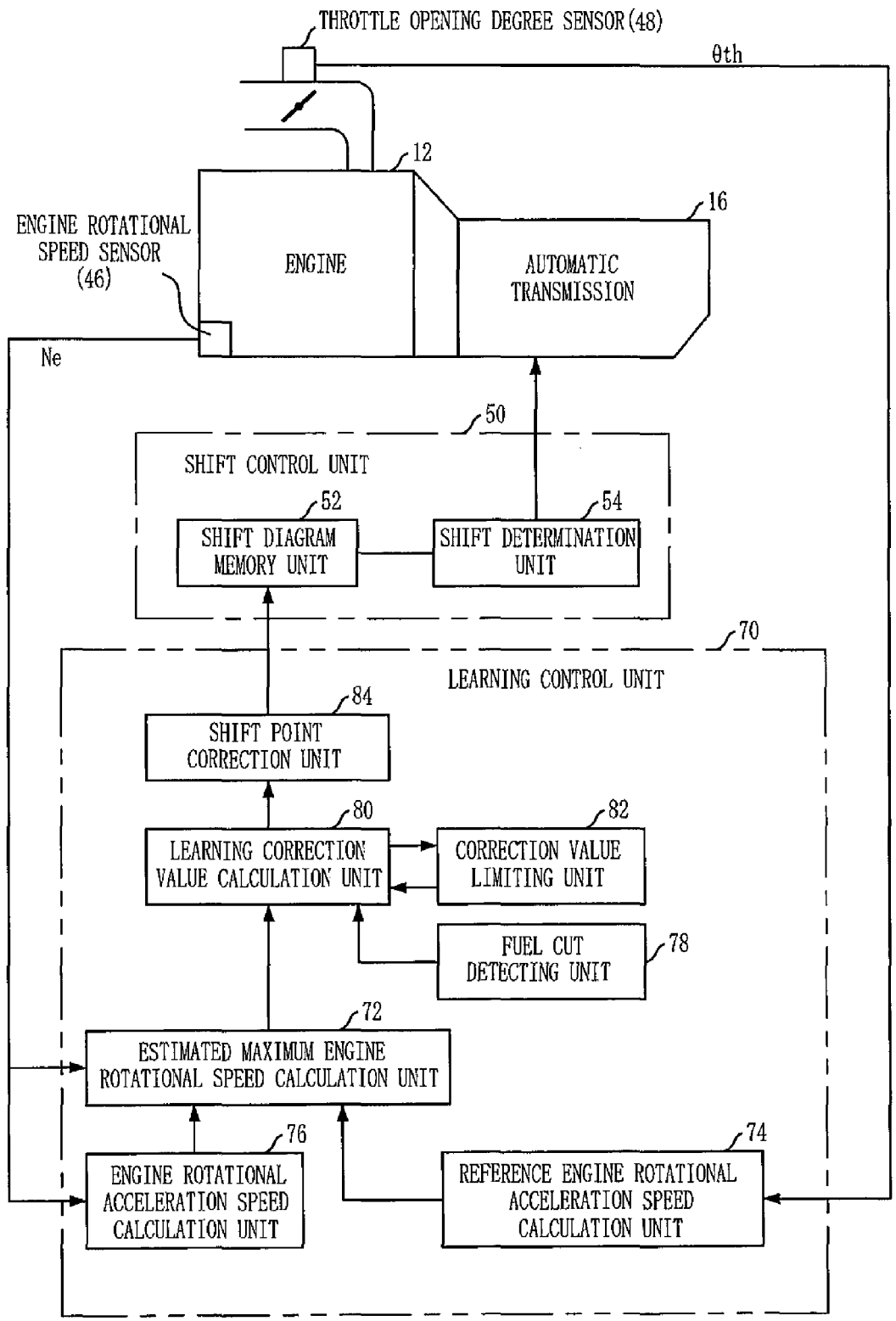
FIG. 18 is a functional block diagram illustrating main function parts controlled by an electronic control unit according to a fourth embodiment of the present invention, wherein FIG. 18 corresponds to FIG. 5.
Figure 19:
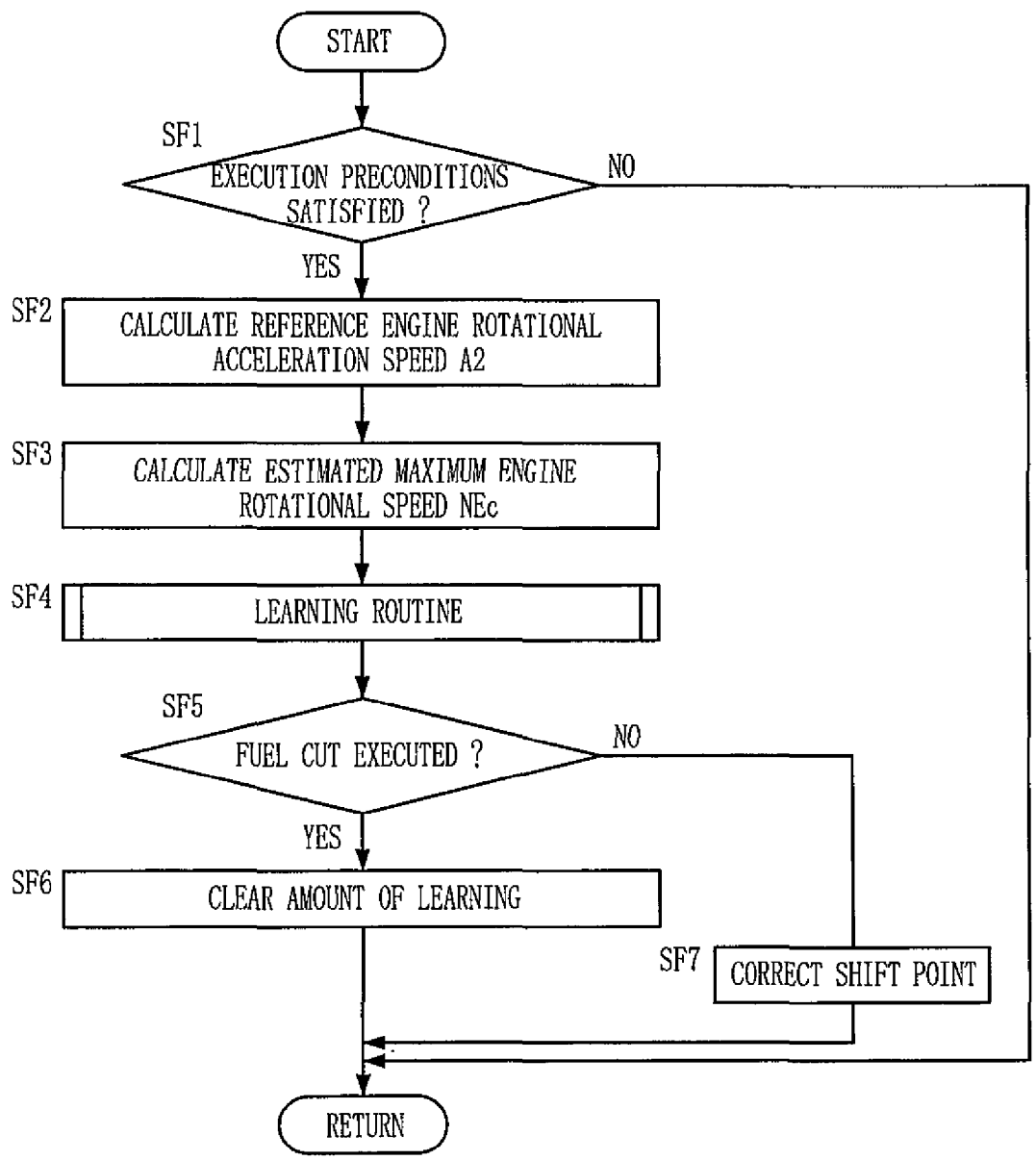
FIG. 19 is a flowchart illustrating main control operations of the electronic control unit according to the embodiment of FIG. 18, wherein FIG. 19 corresponds to FIG. 6.

FIG. 18 is a functional block diagram illustrating main function parts controlled by an electronic control unit 40 according to a fourth embodiment of the present invention, wherein FIG. 18 corresponds to FIG. 5. FIG. 19 is a flowchart illustrating main control operations of the electronic control unit 40 according to the embodiment of FIG. 18, wherein FIG. 19 corresponds to FIG. 6.

The block diagram of FIG. 18 differs from that of FIG. 5 in that the electronic control unit 40 of FIG. 18 includes a fuel cut detecting unit 78. The fuel cut detecting unit 78 detects a fuel cut operation, which is executed by the electronic control unit 40 to interrupt the fuel supply from a fuel supply device (not shown), thus improving the fuel economy of the vehicle, when the vehicle drives in a state in which full throttle inertia driving and predetermined fuel cut conditions are actualized.

The process of the flowchart of FIG. 19 is different from that of FIG. 6 in that SF5 and SF6 are executed after SF1~SF4, which correspond to SA1~SA4 of FIG. 6, and SF7, which corresponds to SA5 of FIG. 6, is selectively executed according to the determination in SF5. In other words, SF1 through SF4 are executed in the same manner as those of FIG. 6 and, thereafter, SF5 is executed, prior to executing either SF6 or SF7 according to the determination in SF5. Further, the procedure of SF1~SF4 is the same as that of SA1~SA4, and further explanation is thus not deemed necessary. Further, the learning routine of SF4 is executed through the same procedure of, for example, FIG. 7, and thus further explanation is not deemed necessary.

At SF5, corresponding to the fuel cut detecting unit 78, it is determined whether a fuel cut operation has been executed during a shift operation. If the determination in SF5 is positive, which indicates that a fuel cut operation of the vehicle has been executed during the shift operation, SF6 is executed. Meanwhile, If the determination in SF5 is negative, which indicates that a fuel cut operation of the vehicle has not been executed during the shift operation, SF7 is executed.

At SF7, which corresponds to the shift point correction unit 84, the shift diagram, which is stored in the shift diagram memory unit 52, is corrected based on the total amount of learning G(N) after learning obtained up to the conclusion of the learning routine at SF4, and the process of this flowchart is ended.

At SF6, which corresponds to the learning correction value calculation unit 80, the total amount of learning G(N), which has been learned up to that time, is cleared to become a zero value "0." SF6 is executed if the determination in SF5 is positive, which indicates that a fuel cut operation has been executed during the shift operation. When a fuel cut operation is executed during the shift operation, the shift operation is not a shift operation in a normal state.

According to the fourth embodiment, if a fuel cut operation is executed in the engine 12, the learning correction value calculation unit 80 (SF6) clears the results of learning G(N) of the shift operation, wherein the fuel cut operation is executed. Further, in the case of a particular shift operation, wherein a fuel cut operation is executed, the shift point correction unit 84 (SF7) does not correct the shift point based on the learning results of the particular shift operation, and thus avoids erroneous learning.

Further, it is possible to adapt the plurality of elements of the apparatuses of the second embodiment through the fourth embodiment to the apparatus of the first embodiment, which is the basic apparatus, at the same time. For example, the second embodiment and the third embodiment may be adapted to the apparatus of the first embodiment at the same time.

Although example embodiments of the present invention have been described for illustrative purposes, those skilled in the art will appreciate that the present invention may be adapted to further embodiments.

For example, in the embodiments, the rotational speed NE and the rotational rotational acceleration speed A of the engine 12 are used to correct the shift point. However, for example, the rotational speed Nt and the rotational rotational acceleration speed dNt/dt of the turbine blade 14t of the torque converter 14, or the output shaft rotational speed Nout and the rotational rotational acceleration speed dNout/dt of the automatic transmission 16, may be used to correct the shift point, instead of the engine rotational speed NE and the engine rotational rotational acceleration speed A. Further, the vehicle speed V and the vehicle acceleration dV/dt may be used to correct the shift point. In other words, a variety of variables, which correspond to the engine rotational speed NE and the engine rotational acceleration speed A in one to one correspondence and are quantitatively equivalent thereto, may be used to correct the shift point. Further, variables, which are directly measured by sensors installed in a vehicle or calculated using measurable values, may also be used to correct the shift point.

Further, in the embodiments, the shift operation to be learned is executed with the throttle opening degree θth being fully open or almost fully open. However, the present invention may be adapted to a shift operation that is executed with the throttle opening degree θth being less than fully open.

Further, the present invention may be adapted to diesel engines having no throttle valve, or to in-cylinder injection engines, rather than internal combustion engines. In the above case, the accelerator operation amount θacc, the amount of fuel injection, or the amount of air suction may be used, instead of the throttle opening degree θth.

Further, in the third embodiment, as illustrated by the learning routine of FIG. 16, the learning correction value calculation unit 80 has three total learning values: Glow(N), Gmid(N) and Ghigh(N), classified according to the AT oil temperature Toil of the automatic transmission 16, and one total learning value according to the shift point oil temperature Toil is learned. However, the learning of the present invention may be executed, as illustrated by the flowchart of FIG. 17, without limit.

Figure 17:
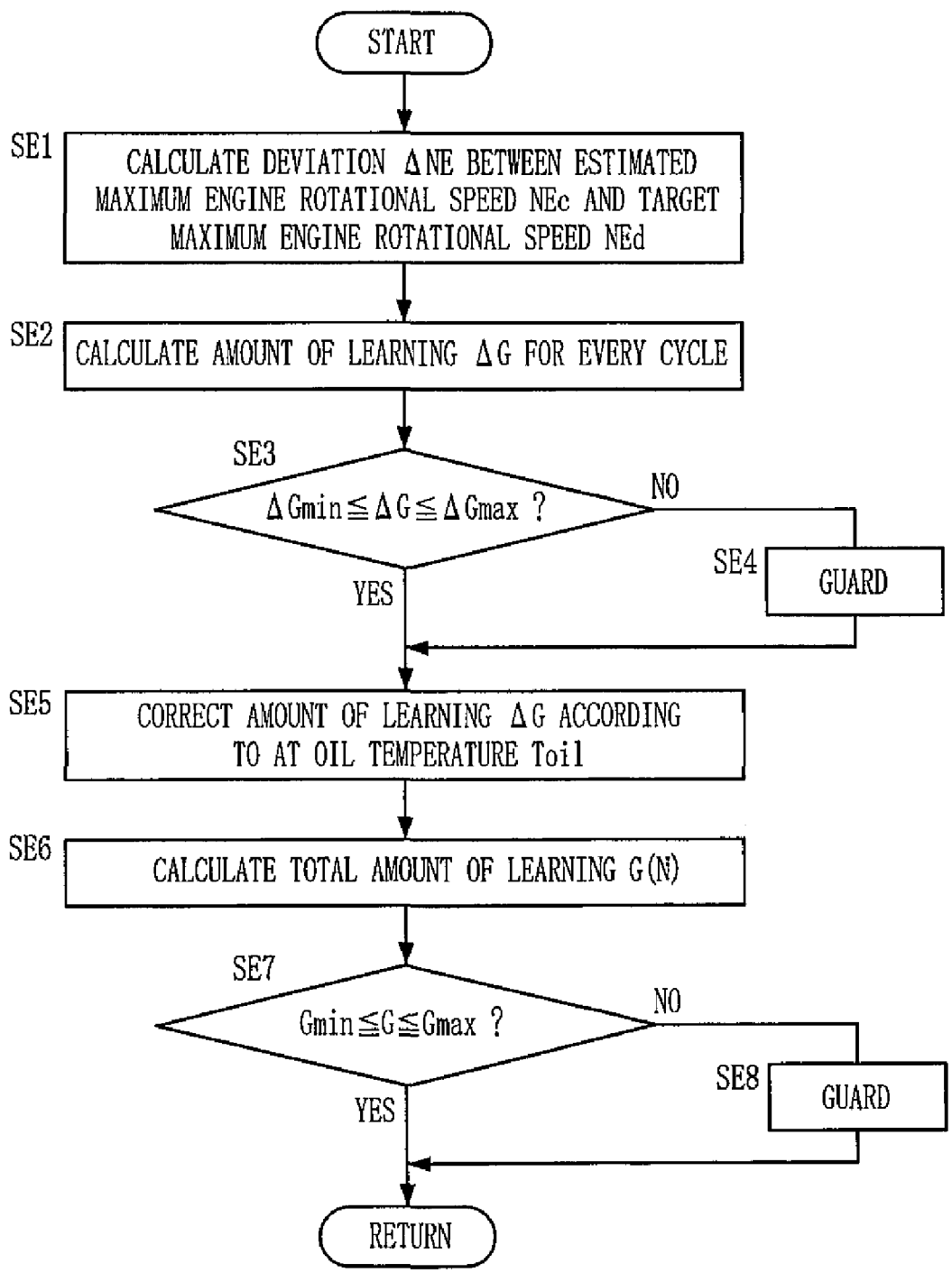
FIG. 17 is a flowchart of a modification of the learning routine shown in FIG. 16.

FIG. 17 is a flowchart showing a learning routine used instead of the learning routine of FIG. 16, FIG. 17 corresponds to FIG. 7. SE1 to SE4 of FIG. 17 correspond respectively to SB1 to SB4 of FIG. 7, SE6 to SE8 of FIG. 17 correspond respectively to SB5 to SB7 FIG. 7, and the operations of SE1 to SE4 and SE6 to SE8 remain the same as those of FIG. 7. However, unlike the learning routine of FIG. 7, SE5 is executed between SE4 and SE6 in the learning routine of FIG. 17. At SE5, the shift point learning value ΔG for every cycle, which has been calculated at SE2 and has been guarded at SE3 and SE4, as demanded, is corrected according to the oil temperature Toil, which has been measured at SC2. The correction method for the shift point learning value ΔG for every cycle is stored in the electronic control unit 40 in the form of an experimentally obtained functional relationship, or in the form of an experimentally obtained map. Because the shift point amount of learning ΔG for every cycle varies according to the AT oil temperature Toil, the learning correction value calculation unit 80, which executes a control operation expressed by the learning routine of FIG. 16, can execute its operation with one total learning value G(N).

Further, in the fourth embodiment, when a fuel cut operation is executed, the total learning value G(N) is cleared. However, instead of clearing the total learning value G(N), for example, the one-time amount of learning ΔG(N) for the shift operation, wherein a fuel cut operation is executed before the execution of the learning (SF4), may be cleared, to thus omit the learning of that shift operation.

Further, in the embodiments, the correction value limiting unit 82 determines a limiting range using predetermined constants during a limiting operation. However, the limiting range may be dynamically changed using variables without limitation.

Further, in the third embodiment, the AT oil temperature Toil of the automatic transmission 16 is measured at the shift point or at a time very near the shift point. However, the AT oil temperature measuring time is not limited to the shift point. For example, the AT oil temperature Toil may be measured at the inertia phase start point, or may be selected from a maximum temperature, a minimum temperature and an average temperature between the temperature at the shift point and the temperature at the inertia phase start point. Further, in the third embodiment, the AT oil temperature Toil of the automatic transmission is used. However, it should be understood that, for example, the viscosity of the AT oil of the automatic transmission 16, which varies according to the oil temperature, may be used instead of the AT oil temperature Toil. In the above case, the viscosity of the AT oil of the automatic transmission 16 may be measured using a viscometer, which may be installed in the automatic transmission 16.

Further, in the respective embodiments, the shift operation to be learned to correct the shift point is an up-shift operation to change the gear from the first shift stage to the second shift stage. However, the present invention may learn every shift operation between each shift stage of the automatic transmission 16 and adjacent shift stages, and may correct the shift point based on the results of learning. Further, the present invention may learn a shift operation to change the gear between specified shift stages and correct the shift point based on the results of learning.

While the invention has been shown and described with respect to the example embodiments, it will be understood by those skilled in the art that various changes and modifications may be made without departing from the spirit and scope of the invention as defined in the following claims.

What is claimed is:

1. An apparatus for controlling an automatic transmission for a vehicle based on a learning correction value, wherein the learning correction value is determined in a manner that a maximum engine rotational speed approaches a target maximum engine rotational speed and the maximum engine rotational speed is an engine rotational speed to be reached during a predetermined time period after an upshift performed when a speed of the vehicle exceeds a preset shift point during power-on driving, the apparatus comprising:

a learning control unit that estimates an estimated maximum engine rotational speed of an engine by replacing the maximum engine rotational speed after the upshift in the power-on driving with the maximum engine rotational speed in a reference driving state that does not affect the acceleration of the vehicle, and calculating the learning correction value based on a deviation between the estimated maximum engine rotational speed and the target maximum engine rotational speed, wherein the learning control unit comprises an estimated maximum engine rotational speed calculation unit that multiplies a deviation between an engine rotational speed at the up-shift point and the engine rotational speed at an inertia phase start point during the upshift by a ratio of an engine rotational acceleration in the reference driving state to an engine rotational acceleration at the up-shift point, and adds the multiplication result to the engine rotational speed at the up-shift point to provide the estimated maximum engine rotational speed.

2. The apparatus according to claim 1, wherein the reference driving state is a driving state of the vehicle when the vehicle is an empty vehicle and drives on a level road.

3. The apparatus according to claim 1, wherein the power-on driving is a maximum acceleration driving when the engine outputs maximum power.

4. The apparatus according to claim 1, wherein the learning control unit comprises a learning correction value calculation unit that calculates the learning correction value, based on the deviation between the estimated maximum engine rotational speed and the target maximum engine rotational speed using a pre-stored relation.

5. The apparatus according to claim 4, wherein the learning control unit comprises a correction value limiting unit that limits the learning correction value calculated by the learning correction value calculation unit in a range from a preset maximum value to a preset minimum value.

6. The apparatus according to claim 4, wherein the learning correction value calculation unit determines the learning correction value based on a working fluid temperature of the automatic transmission.

7. The apparatus for controlling the automatic transmission for a vehicle according to claim 1, wherein the learning control unit does not use a learning result obtained if a fuel cut in the engine is executed during upshift operation.

8. The apparatus for controlling the automatic transmission for a vehicle according to claim 1, wherein the learning control unit corrects the shift point by learning in a manner that, as the deviation between the estimated maximum engine rotational speed and the target maximum engine rotational speed increases, the shift point is moved to a high vehicle speed side.

9. An apparatus for controlling an automatic transmission for a vehicle based on a learning correction value, wherein the learning correction value is determined in a manner that a maximum engine rotational speed approaches a target maximum engine rotational speed and the maximum engine rotational speed is an engine rotational speed to be reached during a predetermined time period after an upshift performed when a speed of the vehicle exceeds a preset shift point during power-on driving, the apparatus comprising:

a learning control unit that estimates an estimated maximum engine rotational speed of an engine by replacing the maximum engine rotational speed after the upshift in the power-on driving with the maximum engine rotational speed in a reference driving state that does not affect the acceleration of the vehicle, and calculating the learning correction value based on a deviation between the estimated maximum engine rotational speed and the target maximum engine rotational speed, wherein the learning control unit comprises estimated maximum engine rotational speed calculation unit that calculates the estimated maximum engine rotational speed, wherein the estimated maximum engine rotational speed is calculated by multiplying a product of multiplying a time period between an upshift point to an associated upshift inertia phase start point and a predetermined engine rotational acceleration from the upshift point to the inertia phase start point by a ratio of an engine rotational acceleration speed at the upshift point in the reference driving state to the engine rotational acceleration speed at the upshift point, and the adding the resulting product to the engine rotational speed at upshift point.

10. The apparatus according to claim 9, wherein the reference driving state is a driving state of the vehicle when the vehicle is an empty vehicle and drives on a level road.

11. The apparatus according to claim 9, wherein the power-on driving is a maximum acceleration driving when the engine outputs maximum power.

12. The apparatus according to claim 9, wherein the learning control unit comprises a learning correction value calculation unit that calculates the learning correction value, based on the deviation between the estimated maximum engine rotational speed and the target maximum engine rotational speed using a pre-stored relation.

13. The apparatus according to claim 12, wherein the learning control unit comprises a correction value limiting unit that limits the learning correction value calculated by the learning correction value calculation unit in a range from a preset maximum value to a preset minimum value.

14. The apparatus according to claim 12, wherein the learning correction value calculation unit determines the learning correction value based on a working fluid temperature of the automatic transmission.

15. The apparatus for controlling the automatic transmission for the vehicle according to claim 9, wherein the learning control unit does not use a learning result obtained if a fuel cut in the engine is executed during upshift operation.

16. The apparatus for controlling the automatic transmission for the vehicle according to claim 9, wherein the learning control unit corrects the shift point by learning in a manner that, as the deviation between the estimated maximum engine rotational speed and the target maximum engine rotational speed increases, the shift point is moved to a high vehicle speed side.

* * * * *